United States Patent
Asano

(10) Patent No.: US 7,716,917 B2
(45) Date of Patent: May 18, 2010

(54) APPARATUS AND METHOD FOR CONTROLLING AIR/FUEL RATIO OF INTERNAL COMBUSTION ENGINE

(75) Inventor: Seiji Asano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 892 days.

(21) Appl. No.: 11/542,164

(22) Filed: Oct. 4, 2006

(65) Prior Publication Data

US 2007/0079596 A1 Apr. 12, 2007

(30) Foreign Application Priority Data

Oct. 6, 2005 (JP) ............................. 2005-293516

(51) Int. Cl.
*F01N 3/00* (2006.01)
*F02B 27/04* (2006.01)
(52) U.S. Cl. .............................. 60/285; 60/273; 60/276
(58) Field of Classification Search ........... 60/276–277, 60/285, 273; 701/109
See application file for complete search history.

(56) References Cited

U.S. PATENT DOCUMENTS 5,406,789 A * 4/1995 Takizawa et al. .............. 60/276
5,732,552 A * 3/1998 Matsumoto et al. ........... 60/276
2004/0006971 A1 * 1/2004 Kamoto et al. ................ 60/277
2005/0022510 A1 2/2005 Nakagawa et al.

FOREIGN PATENT DOCUMENTS

| JP | 63147941 A | * | 6/1988 |
| JP | 2000235015 A | * | 8/2000 |
| JP | 2005-48711 A | | 2/2005 |

* cited by examiner

*Primary Examiner*—Thomas E. Denion
*Assistant Examiner*—Audrey Klasterka
(74) *Attorney, Agent, or Firm*—Crowell & Moring, LLP

(57) ABSTRACT

An apparatus for controlling air-fuel ratio of an internal combustion engine having: a three-way catalytic converter; an oxygen sensor, which is installed at the upstream side of said catalytic converter in respect to exhaust gas flow direction, for generating a switching signal showing rich/lean relative to a certain air-fuel ratio; and an air-fuel ratio sensor, which is installed at the downstream side of said catalytic converter, for generating a linear output signal corresponding to the air-fuel ratio, wherein the apparatus includes a deviation calculation unit for calculating deviation between air-fuel ratio measured by the air-fuel ratio sensor, and target air-fuel ratio; and a feedback control unit of the air-fuel ratio for carrying out feedback control of air-fuel ratio based on the deviation calculated by a deviation calculation unit, and the output signal of the oxygen sensor.

12 Claims, 27 Drawing Sheets

APPARATUS AND METHOD FOR CONTROLLING AIR/FUEL RATIO OF INTERNAL COMBUSTION ENGINE

BACKGROUND OF THE INVENTION

The present invention relates to an apparatus for controlling air-fuel ratio of an internal combustion engine (engine), and a method for controlling air-fuel ratio, and specifically relates to an apparatus for controlling air-fuel ratio of an internal combustion engine, and a method for controlling air-fuel ratio, wherein fuel control is carried out by means of feedback control of air-fuel ratio in an internal combustion engine equipped with a three-way catalytic converter.

As conventional technology of an apparatus for controlling air-fuel ratio of an internal combustion engine, such one is well-known that is composed of carrying out main feedback control, which features a rapid convergence to target air-fuel ratio, using a air-fuel ratio sensor installed at the upstream side of a catalytic converter, and carrying out sub-feedback control, using an oxygen sensor installed at the downstream side of a catalytic converter, in consideration of controllability of air-fuel ratio at the transitional period of operation of an engine (for example, JP-A-2005-48711).

The main feedback control is carried out in such a way that fuel injection amount is set "rich" when air-fuel ratio of exhaust gas flowing in the catalytic converter is "leaner" than target air-fuel ratio, while fuel injection amount is set "lean" when air-fuel ratio of exhaust gas is "richer" than target air-fuel ratio.

The sub-feedback control is carried out in such a way that fuel injection amount is set "rich" when exhaust gas flowing out of the catalytic converter is "leaner" than the stoichiometric air-fuel ratio, while fuel injection amount is set "lean" when air-fuel ratio of exhaust gas flowing out of the catalytic converter is "richer" than the stoichiometric air-fuel ratio.

SUMMARY OF THE INVENTION

In the meantime, air-fuel ratio detected by an oxygen sensor at the downstream side of a catalytic converter shows delay relative to air-fuel ratio detected by an air-fuel ratio sensor at the upstream side of the catalytic converter, by time required for exhaust gas to flow through the catalytic converter. Subsequently, in the case when air-fuel ratio is judged "rich/lean" at the downstream side of the catalytic converter, air-fuel ratio at the upstream side of the catalytic converter is already in an overshoot state, which incurs degradation of exhaust emission. In addition to this, in the case where an oxygen sensor is used at the downstream side of the catalytic converter, it is impossible to judge how much deviation is present between air-fuel ratio determined by exhaust gas at the downstream side of the catalytic converter, and the stoichiometric air-fuel ratio, which could accelerates the overshoot.

In addition, a signal processing circuit of the air-fuel ratio sensor is complicated in the processing circuit itself, and also requires a heater drive circuit built-in the sensor. As for an engine having two banks such as a V6 engine, and the like, two air-fuel ratio sensors are required at the upstream side of a catalytic converter, and therefore two systems of complicated signal processing circuits are also required, which increases cost.

Furthermore, the air-fuel ratio sensor is weak to moisture, and in the case where the air-fuel ratio sensor is installed at the upstream side of the catalytic converter, moisture exhausted by an engine at the start-up could incur element fracture, unless a sufficient period of time is taken before heater drive start-up after engine start up. Therefore, a considerable length of time is required to completely remove moisture after start-up of an engine, and heater control becomes possible, compared with that of the oxygen sensor. It means requirement of a considerable length of time till activation of the air-fuel ratio sensor after start-up of an engine, which incurs degradation of exhaust emission just after start-up of an engine.

The present invention is made in view of the above problems and aims at providing an apparatus for controlling air-fuel ratio of an internal combustion engine, wherein feedback control of air-fuel ratio is suitably carried out, without causing degradation of exhaust emission, and a method for controlling air-fuel ratio.

To achieve the above object, a control apparatus for controlling air-fuel ratio of an internal combustion engine according to the present invention provided. The engine is equipped with at the exhaust gas passage: a catalytic converter having a three-way function; an oxygen sensor, which is installed at the upstream side of said catalytic converter in respect to exhaust gas flow direction, for generating a switching signal showing rich/lean relative to a certain air-fuel ratio; and an air-fuel ratio sensor, which is installed at the downstream side of said catalytic converter in respect to exhaust gas flow direction, for generating a linear output signal responsive to the air-fuel ratio. The control apparatus has a deviation calculation means for calculating deviation between the air-fuel ratio measured by said air-fuel ratio sensor, and target air-fuel ratio; and a feedback control means of the air-fuel ratio for carrying out feedback control of the air-fuel ratio based on the deviation calculated by said deviation calculation means, and the output signal of said oxygen sensor.

In the control apparatus for controlling air-fuel ratio of an internal combustion engine according to the present invention, preferably said feedback control means of the air-fuel ratio carries out the feedback control of the air-fuel ratio, responsive to difference value between the output signal of said oxygen sensor, and a threshold value set responsive to deviation calculated by said deviation calculation means.

In the control apparatus for controlling air-fuel ratio of an internal combustion engine according to the present invention, preferably said feedback control means of the air-fuel ratio has a control variable calculation means for calculating a variable for feedback control of the air-fuel ratio by deviation calculated by said deviation calculation means; a comparison means for comparing whether the output voltage of said oxygen sensor is larger than a threshold value set responsive to deviation calculated by said deviation calculation means or not; and a reflection judgment means for judging whether the control variable by said control variable calculation means should be reflected to feedback control of the air-fuel ratio or not, based on the comparison result of said comparison means and the control variable by said control variable calculation means.

In the control apparatus for controlling air-fuel ratio of an internal combustion engine according to the present invention, preferably said air-fuel ratio sensor is a linear air-fuel ratio sensor equipped with a heater, and drive of said heater is started after a specified period of time has passed from the start-up time of an internal combustion engine, and the output of said air-fuel ratio sensor is adopted after heater temperature has become not lower than a specified value.

In the control apparatus for controlling air-fuel ratio of an internal combustion engine according to the present invention, preferably said air-fuel ratio sensor is a linear air-fuel ratio sensor equipped with a heater, and drive of said heater is started after a specified period of time has passed from the time when the output of said oxygen sensor is judged to be adoptable, and the output of said air-fuel ratio sensor is adopted after heater temperature has become not lower than a specified value.

The control apparatus for controlling air-fuel ratio of an internal combustion engine according to the present invention preferably has further a deterioration detection means of a catalytic converter for detecting deterioration degree of said catalytic converter, and the gain of feedback control of the air-fuel ratio is switched and set responsive to deterioration degree of said catalytic converter detected by said deterioration detection means of the catalytic converter.

A method for controlling air-fuel ratio of an internal combustion engine according to the present invention is a method for controlling air-fuel ratio of an internal combustion engine equipped with at the exhaust gas passage:

a catalytic converter having a three-way function;

an oxygen sensor, which is installed at the upstream side of said catalytic converter in respect to exhaust gas flow direction, for generating a switching signal showing rich/lean relative to a certain air-fuel ratio; and an air-fuel ratio sensor, which is installed at the downstream side of said catalytic converter in respect to exhaust gas flow direction, for generating a linear output signal responsive to the air-fuel ratio, wherein the method comprising the steps of:

calculating deviation between the air-fuel ratio measured by said air-fuel ratio sensor, and target air-fuel ratio; and carrying out feedback control of the air-fuel ratio, based on said deviation and the output signal of said oxygen sensor.

In an apparatus for controlling air-fuel ratio of an internal combustion engine according to the present invention, an oxygen sensor is installed at the upstream side of a catalytic converter and an air-fuel ratio sensor is installed at the downstream side of a catalytic converter, and feedback control of the air-fuel ratio is carried out based on the deviation between the air-fuel ratio measured by said air-fuel ratio sensor, and target air-fuel ratio, and the output signal of the oxygen sensor, therefore overshoot of the air-fuel ratio at the upstream side of a catalytic converter can be prevented, and degradation of exhaust emission can be prevented.

Other objects, features and advantages of the invention will become apparent from the following description of the embodiments of the invention taken in conjunction with the accompanying drawings.

DESCRIPTION OF THE EMBODIMENTS

The embodiments of an apparatus for controlling air-fuel ratio of an internal combustion engine relevant to the present invention are explained in detail by referring to drawings.

Figure 1:
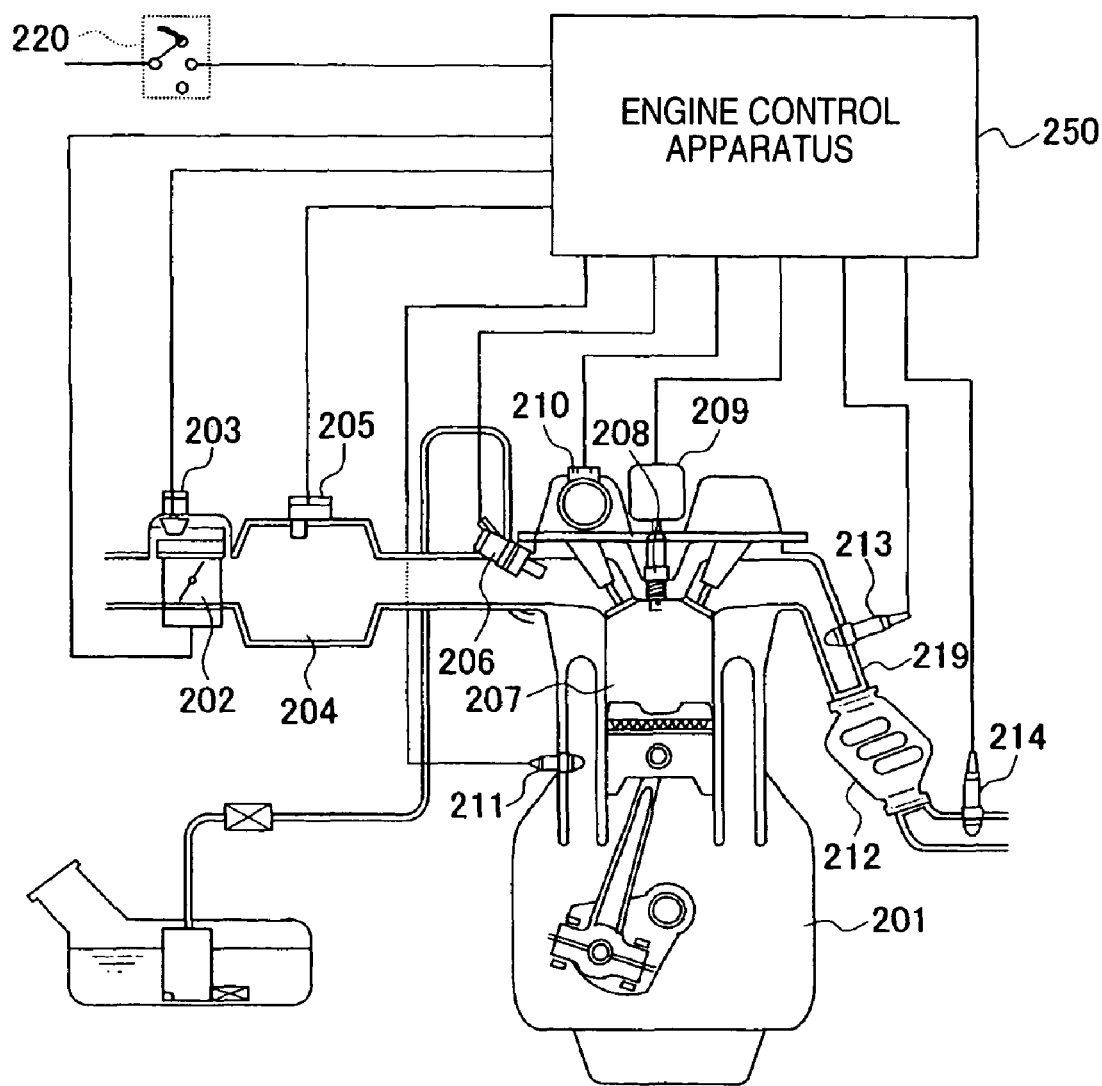
FIG. 1 is a whole block diagram of an internal combustion engine to which one embodiment of an apparatus for controlling air-fuel ratio of an internal combustion engine according to the present invention is applied.
Figure 2:
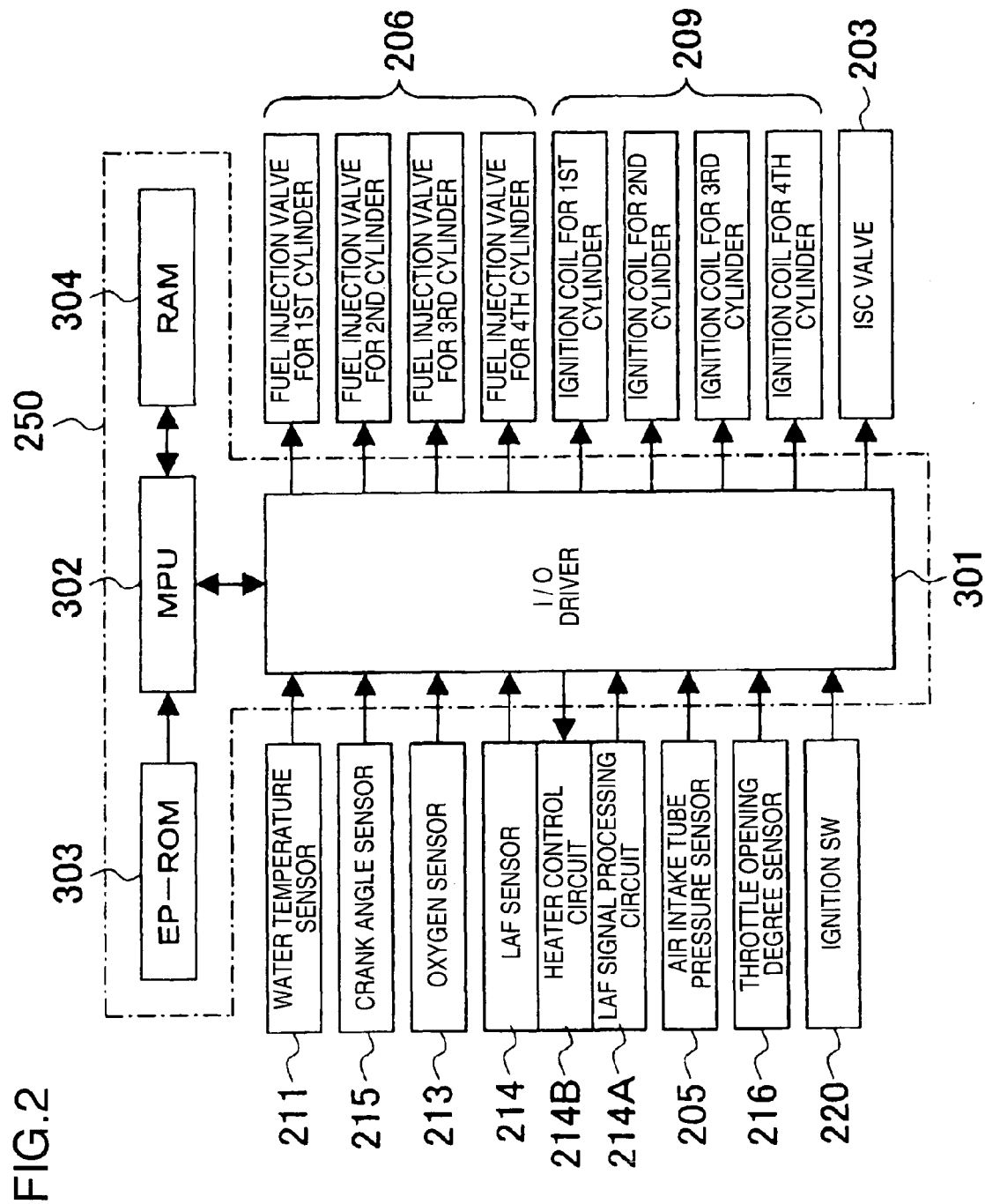
FIG. 2 is a control block diagram showing inner composition of a control apparatus to which an apparatus for controlling air-fuel ratio of an internal combustion engine according to the present invention is applied.

FIG. 1 is a whole block diagram of an internal combustion engine (engine) to which one embodiment of an apparatus for controlling air-fuel ratio of an internal combustion engine according to the present invention is applied.

In FIG. 1, the engine 201 has, in the air intake system, the throttle valve 202 for metering air intake amount, the idling speed control valve (ISC valve) 203 for controlling idling speed of the engine 201 by controlling area of the flow passage connected to the air intake tube 204 bypassing the throttle valve 202, the air intake tube pressure sensor 205 for detecting pressure inside the air intake tube 204, and the fuel injection valve 206 for injection supplying fuel required by the engine 201.

The engine 201 is equipped with the ignition plug 208 for igniting mixed gas of air and fuel supplied inside the cylinder (the combustion chamber) 207, and the ignition coil (the ignition module) 209 for supplying ignition energy based on the ignition signal of the engine control apparatus 250.

In addition, the engine 201 is equipped with the cam angle sensor 210 for detecting cam angle, and the water temperature sensor 211 for detecting coolant temperature.

To the exhaust gas tube 219, the catalytic converter 212 is connected. At the upstream side of the catalytic converter 212 in respect to flow direction of exhaust gas, the oxygen sensor 213 made of zirconia oxygen sensors is arranged, for outputting binary signal by detecting oxygen concentration in exhaust gas. The oxygen sensor 213 generates a switching signal showing "rich/lean" relative to air-fuel ratio.

At the downstream side of the catalytic converter 212 in respect to exhaust gas flow direction, the linear air-fuel ratio sensor (the LAF sensor) 214 equipped with a heater is arranged, for outputting a linear signal in proportion to oxygen concentration in exhaust gas passing through the catalytic converter 212.

Operation and stop of the engine 201 is carried out by the ignition key switch 220, which is a main switch. Fuel control, ignition timing control, idling control, and the like including air-fuel ratio control of the engine 201 is carried out by the engine control apparatus 250. The engine control apparatus 250 functions as an apparatus for controlling air-fuel ratio.

In the present embodiment, idling speed of the engine 201 is controlled by the idling speed control valve 203, however, in the case where the throttle valve 202 can be controlled by an electric motor, and the like, the idling speed can be controlled by the throttle valve 202, and therefore the idling speed control valve 203 is not required.

The engine control apparatus 250 is an electronic control type by microcomputer, and is composed of the I/O LSI (Input/Output Large Scale Integrated circuit) 301 for converting electric signals of each sensor installed at the engine 201 to signals for digital calculation processing, and for converting the control signals for digital calculation to drive signals of a practical actuator; the processing unit 302 for judging the state of the engine 201 based on the signals for digital calculation processing from the I/O LSI 301, for calculating processing fuel amount required by the engine 201 and ignition timing, and the like, based on procedure specified in advance, and for sending the calculated value to the I/O LSI 301; the non-volatile memory (EP-ROM) 303 for storing control procedure and control constants of the processing unit 302; and the volatile memory (RAM) 304 for storing calculation results, and the like of the processing unit 302. To the volatile memory 304, backup electric source may be connected aiming at storing memory content, even when the ignition switch 220 is off and power is not supplied to the engine control apparatus 250 from the battery electric source.

In the present embodiment, the engine control apparatus 250 inputs the signals from each of the water temperature sensor 211, the crank angle sensor 215, the oxygen sensor 213, the linear air-fuel ratio sensor 214, the air intake tube pressure sensor 205, the throttle opening degree sensor 216 and the ignition switch 220, and outputs each of the direction signal of fuel injection to the fuel injection valve 206, the ignition direction signal to the ignition coil 209, the opening degree direction signal to the idling speed control valve 203, and the heater control signal to the air-fuel ratio sensor 214.

In this connection, the linear air-fuel ratio sensor 214 has the linear air-fuel ratio signal processing circuit 214A and the heater control circuit 214B. In an engine having two banks such as a V-type engine, and the like, the oxygen sensor 213 installed at the downstream side of the catalytic converter 212 is independently installed by each bank, however, the linear air-fuel ratio sensor 214 installed at the downstream side of the catalytic converter 212 may be one, even in an engine having two banks such as a V-type engine, and the like.

In this connection, in the present embodiment, fuel control is accomplished by detecting air intake tube pressure, however, fuel control can be accomplished also by detecting intake air amount of the engine 201.

Figure 3:
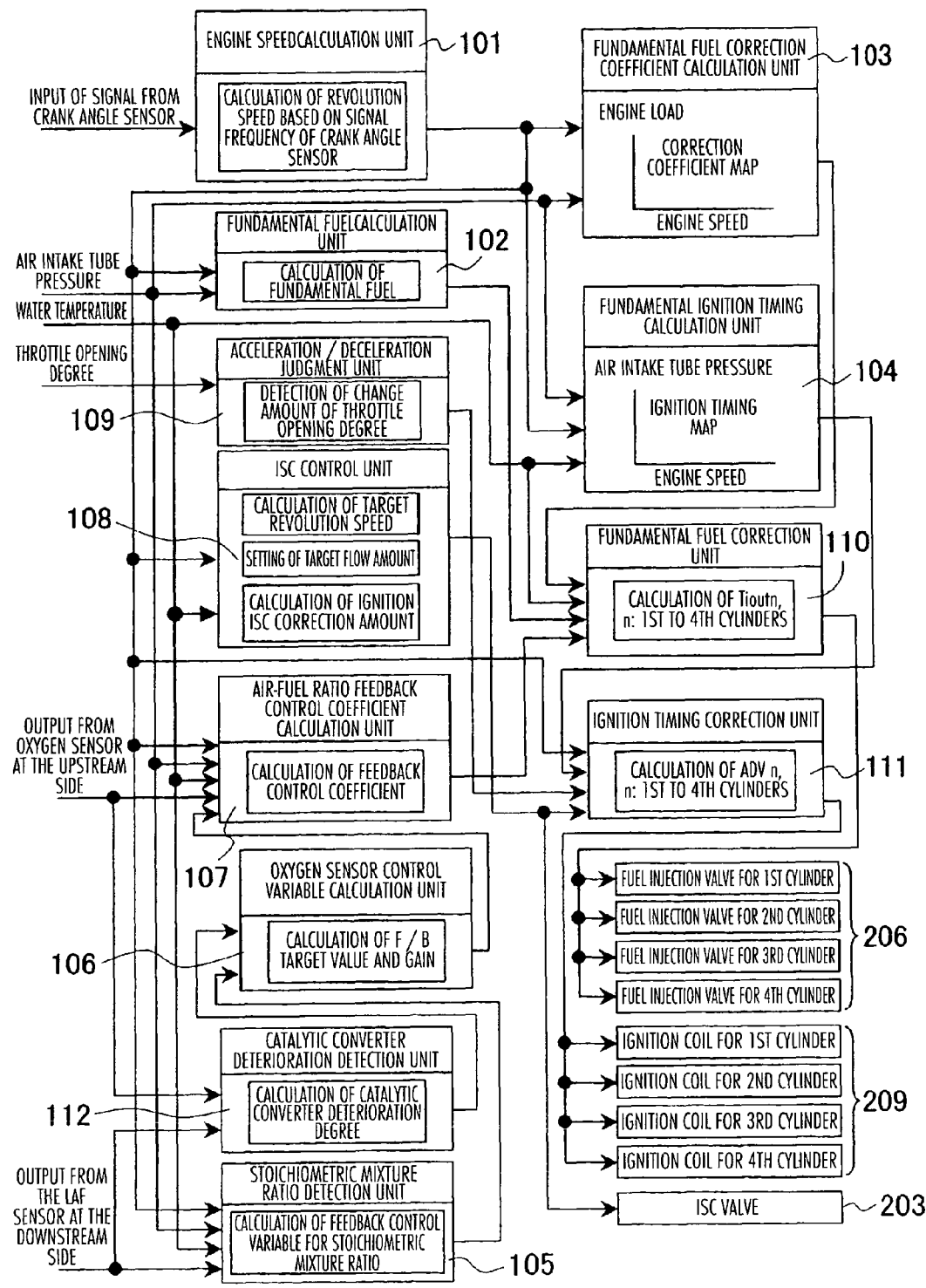
FIG. 3 is a block diagram of a control apparatus of an internal combustion engine to which one embodiment of an apparatus for controlling air-fuel ratio of an internal combustion engine according to the present invention is applied.

Then, one embodiment of a control block of the engine control apparatus 250 wherein a control method for an air-fuel ratio according to the present invention is carried out is explained by referring to FIG. 3.

The engine control apparatus 250 embodies, in a software way, by execution of a computer program, the engine speed calculation unit 101, the fundamental fuel calculation unit 102, the fundamental fuel correction coefficient calculation unit 103, the fundamental ignition timing calculation unit 104, the stoichiometric mixture ratio detection unit 105, the catalytic converter deterioration detection unit 112, the oxygen sensor control variable calculation unit 106, the feedback control coefficient of air-fuel ratio calculation unit 107, the ISC control unit 108, the acceleration/deceleration judgment unit 109, the fundamental fuel correction unit 110, and the ignition timing correction unit 111.

The engine speed calculation unit 101 calculates the revolution number per unit time of the engine 201 by counting and calculation processing the electric signals, mainly input number per unit time of pulse signal change, of the crank angle sensor 215 installed at a specified crank angle position of the engine 201.

The fundamental fuel calculation unit 102 calculates fundamental fuel required by the engine 201 based on engine speed calculated by the engine speed calculation unit 101, and air intake tube pressure (engine load) detected by the air intake tube pressure sensor 205 installed at the air intake tube 204 of the engine 201.

The fundamental fuel correction coefficient calculation unit 103 calculates correction coefficient at each operation region of the engine 201, of fundamental fuel calculated by the fundamental fuel calculation unit 102 from engine speed calculated by the engine speed calculation unit 101, and air intake tube pressure (engine load).

The fundamental ignition timing calculation unit 104 determines optimal ignition timing of the engine 201 by retrieval from the data map, and the like, responsive to the engine speed and air intake tube pressure (engine load).

The stoichiometric mixture ratio detection unit 105 detects the stoichiometric mixture ratio point of the catalytic converter 212 from the output of the air-fuel ratio sensor 214 installed at the downstream side of the catalytic converter 212 of the exhaust gas tube 219 of the engine 201 (output of the LAF sensor at the downstream side). The output of the air-fuel ratio sensor 214 which is input to the stoichiometric mixture ratio detection unit 105 is a voltage signal showing linear characteristics responsive to the air-fuel ratio of exhaust gas at the downstream side of the catalytic converter 212.

The catalytic converter deterioration detection unit 112 calculates deterioration degree of the catalytic converter 212 from the output of the oxygen sensor 213 at the upstream side of the catalytic converter 212, and the output of the air-fuel ratio sensor 214 at the downstream side of the catalytic converter 212.

The oxygen sensor control variable calculation unit 106 determines feedback control target value and feedback control gain for feedback control of the air-fuel ratio of the oxygen sensor 213 at the upstream side of the catalytic converter 212, based on the stoichiometric mixture ratio point of the catalytic converter 212 detected by the stoichiometric mixture ratio detection unit 105, and deterioration degree of the catalytic converter 212 detected by the catalytic converter deterioration detection unit 112.

The feedback control coefficient of air-fuel ratio calculation unit 107 carries out air-fuel ratio feedback control based on the air-fuel ratio feedback control variable determined by the oxygen sensor control variable calculation unit 106, the signal of the oxygen sensor at the upstream side of the catalytic converter 212 (output of the oxygen sensor at the upstream side), engine speed, air intake tube pressure and engine water temperature.

The ISC control unit 108 sets a target idling speed to maintain the idling speed of the engine 201 at a specified value, and calculates target flow amount to the ISC valve 203, and ISC ignition timing correction amount. The ISC control unit 108 outputs the ISC valve signal based on the target flow amount to the ISC valve 203. By this output, the ISC valve 203 is driven so that the target idling flow amount is attained.

The acceleration/deceleration judgment unit 109 processes the electric signals outputted from the throttle valve opening degree sensor 216, judges whether the engine 201 is in an acceleration state or in a deceleration state, and calculates the ignition timing correction amount in acceleration/deceleration.

The fundamental fuel correction unit 110 carries out correction to fundamental fuel calculated by the fundamental fuel calculation unit 102, by using correction coefficient of the fundamental fuel correction coefficient calculation unit 103, and the feedback control coefficient of air-fuel ratio of the feedback control coefficient of air-fuel ratio calculation unit 107, and the like, and outputs the fuel injection command signal Tioutn by the fuel amount after correction, to the fuel injection valve 206 of each cylinder. By this output, the fuel injection valve 206 injects and supplies fuel in a specified fuel amount to each cylinder.

The ignition timing correction unit 111 carries out correction to fundamental ignition timing determined by the fundamental ignition timing calculation unit 104, by using the ISC ignition timing correction amount of the ISC control unit 108, and the ignition timing correction amount in acceleration/deceleration of the acceleration/deceleration judgment unit 109, and the like, and outputs the ignition timing direction signal after correction to the ignition coil 209 of each cylinder. By this output, the ignition plug 208 of each cylinder spark discharges in a specified ignition timing, and ignition of mixed gas flowing into the cylinder 207 is carried out.

In this connection, in the present embodiment, engine load is represented by air intake tube pressure, however, engine load may be represented by air amount which the engine intakes.

Figure 4:
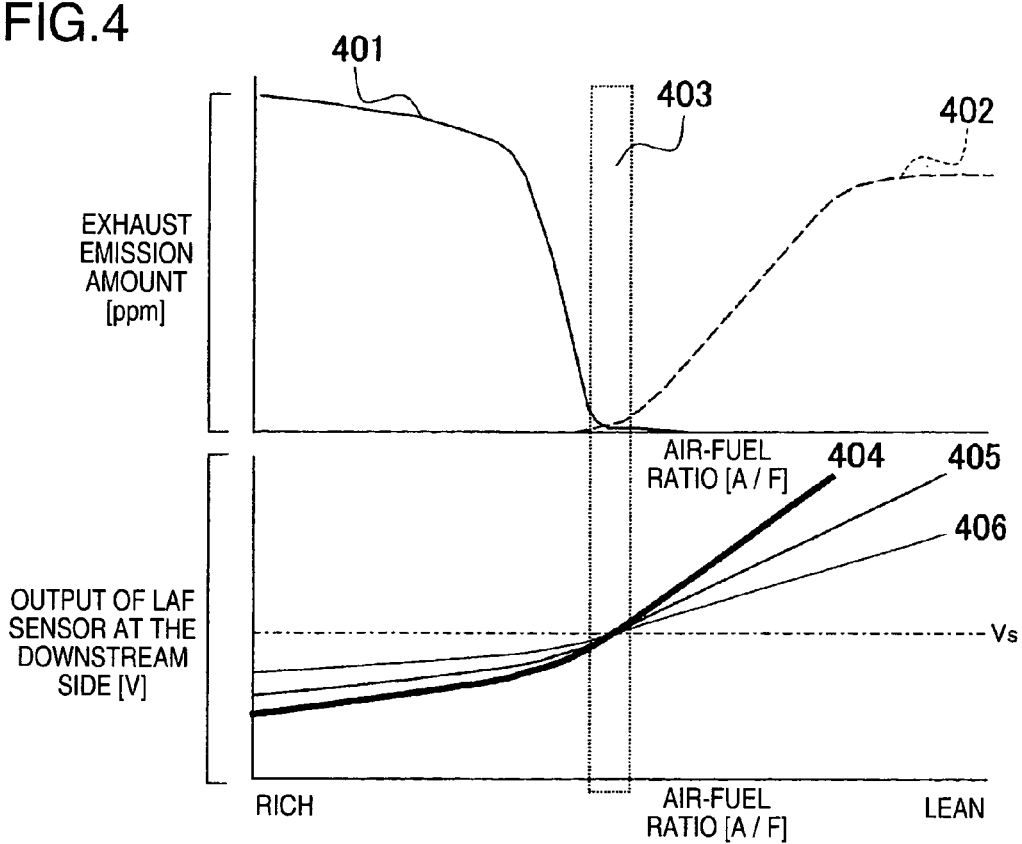
FIG. 4 is a graph showing an example of behaviors of the exhaust emission and the output signal of the air-fuel ratio sensor relative to air-fuel ratio of an engine in the present embodiment.

FIG. 4 shows an example of behaviors of the exhaustion emission and the output signal of the air-fuel ratio sensor 214 relative to air-fuel ratio of an engine in the present embodiment.

The characteristic line 401 shows exhausted hydrocarbon relative to air-fuel ratio, while the characteristic line 402 shows exhausted NOx. The area 403 shows the stoichiometric area of the catalytic converter 212 set at the engine 201 of the present embodiment.

The characteristic lines 404, 405 and 406 show variation of the output signal of the air-fuel ratio sensor 214 at the downstream side of the catalytic converter 212 (output of the LAF sensor at the downstream side). The variation of the output signal of the air-fuel ratio sensor 214 is shown in each inclination, with the voltage Vs at the stoichiometric mixture ratio as a fixed point.

In the case where the air-fuel ratio sensor is installed at the upstream side of the catalytic converter 212, different from the present embodiment, absolute value of air-fuel ratio becomes important, and setting of a resistance for adjustment (for discrimination) at the processing circuit of the air-fuel ratio sensor or inside the sensor is required to correct the variation.

However, in the present embodiment, such a resistance for adjustment (for discrimination) is not necessary, because only judgment of whether deviation from the stoichiometric area at the downstream side of the catalytic converter 212 is present or not is enough.

Figure 5:
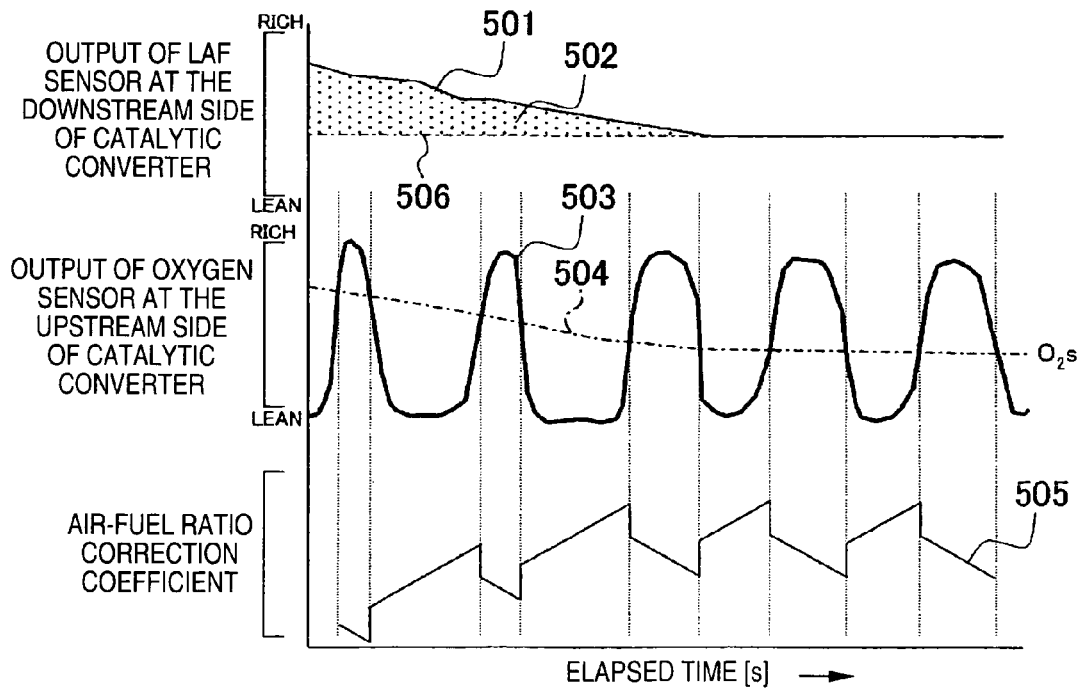
FIG. 5 is a time chart showing an example of behaviors of the output of an air-fuel ratio sensor, the output of an oxygen sensor and feedback control coefficient of air-fuel ratio of an engine where air-fuel ratio control of the present embodiment is carried out.

FIG. 5 shows an example of behaviors of the output of the air-fuel ratio sensor, the output of the oxygen sensor, and feedback control coefficient of air-fuel ratio of an engine where air-fuel ratio control of the present embodiment is carried out.

The characteristic line 501 shows the output signal of the air-fuel ratio sensor 214 at the downstream side of the catalytic converter, and shows deviation from the stoichiometric area 506 of the catalytic converter 212 as shown by the area 502. To correct this deviation, the reverse threshold value O2s of the output of the oxygen sensor, which is shown by characteristic line 503, is corrected as shown by the characteristic line 504.

As the result of this correction, air-fuel ratio correction coefficient changes as shown by the characteristic line 505, and air-fuel ratio at the downstream side of the catalytic converter is stabilized within the stoichiometric area.

As described above, the air-fuel ratio sensor 214 is installed, so that deviation degree of air-fuel ratio of exhausted gas from the stoichiometric air-fuel ratio (stoichiometric area) can be judged at the downstream side of the catalytic converter. The air-fuel ratio sensor 214 has production variation, and quantitative output thereof varies around the center of the stoichiometric point, however, in the present embodiment, correction unit of the variation is not required, because quantitative value is not important. The oxygen sensor 213 is installed at the upstream side of the catalytic converter, and by switching a feedback reflecting method based on the output state thereof and the state of each variable of air-fuel ratio feedback control, overshoot of the air-fuel ratio at the upstream side of the catalytic converter can be prevented. For example, even when feedback by the air-fuel ratio sensor at the downstream side of the catalytic converter indicates correction of fuel to a rich side, feedback reflection is set not to be operated, in the case when the oxygen sensor 213 at the upstream side of the catalytic converter shows a lean side.

In addition, setting of the oxygen sensor 213 at the upstream side of the catalytic converter tends to deteriorate convergence to target air-fuel ratio in some degree, however, in recent oxygen sensors, improvement of exhaust emission after start-up of an engine has been attained, because of significant shortening of rise time to reach activation state of catalyst after start-up of an engine, in view of much exhaust emission after start-up of an engine.

As described above, the effects of the present embodiment are summarized as follows; the oxygen sensor 213 is installed at the upstream side of the catalytic converter, and by switching a feedback reflecting method based on the output state thereof and the state of each variable of air-fuel ratio feedback control, overshoot of the air-fuel ratio at the upstream side of the catalytic converter can be prevented, and degradation of exhaust emission can be prevented. By setting the oxygen sensor 213 at the upstream side of the catalytic converter, air-fuel ratio feedback can be started earlier from start-up of an engine and emission controlling performance can be more improved, compared with the case when the air-fuel ratio sensor is installed at the upstream side of the catalytic converter. Because the processing circuit of the oxygen sensor 213 is relatively cheaper than that of the air-fuel ratio sensor, cost can be suppressed lower, also in two-bank engines such as V6, and the like.

Figure 6:
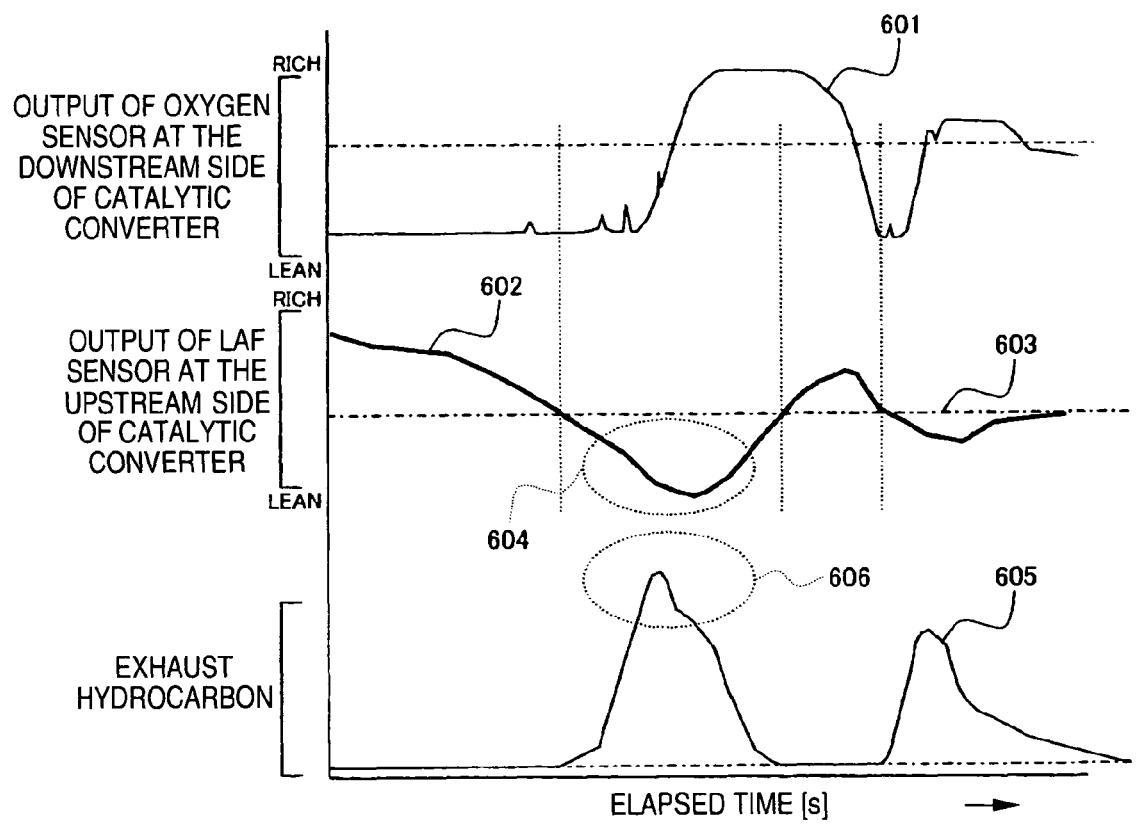
FIG. 6 is a time chart showing an example of behaviors of the output of an air-fuel ratio sensor, the output of an oxygen sensor and feedback control coefficient of air-fuel ratio of an engine of an embodiment different from the present embodiment (a conventional example).

FIG. 6 shows an example of behaviors of the output of the air-fuel ratio sensor, the output of the oxygen sensor, and exhaust hydrocarbon, in the case where the air-fuel ratio sensor is installed at the upstream side of the catalytic converter, and the oxygen sensor is installed at the downstream side of the catalytic converter to carry out air-fuel ratio control (a conventional example), different from the present embodiment.

The characteristic line 601 shows the output signal of the oxygen sensor at the downstream side of the catalytic converter, while the characteristic line 602 shows the output signal of the air-fuel ratio sensor at the upstream side of the catalytic converter.

In the case where feedback control is carried out to air-fuel ratio at the upstream side of the catalytic converter, so that air-fuel ratio at the downstream side of the catalytic converter is within the stoichiometric area, it results in crossing the stoichiometric area 603 at the upstream side of the catalytic converter, because the oxygen sensor is installed at the downstream side of the catalytic converter. In this case, because delay time of the oxygen sensor, reaction delay inside the catalytic converter, and the like are included, air-fuel ratio at the upstream side of the catalytic converter generates overshoot as shown by the area 604. Therefore, exhaust hydrocarbon shown by the characteristics line 605 results in significant increase as shown by the area 606.

Figure 7:
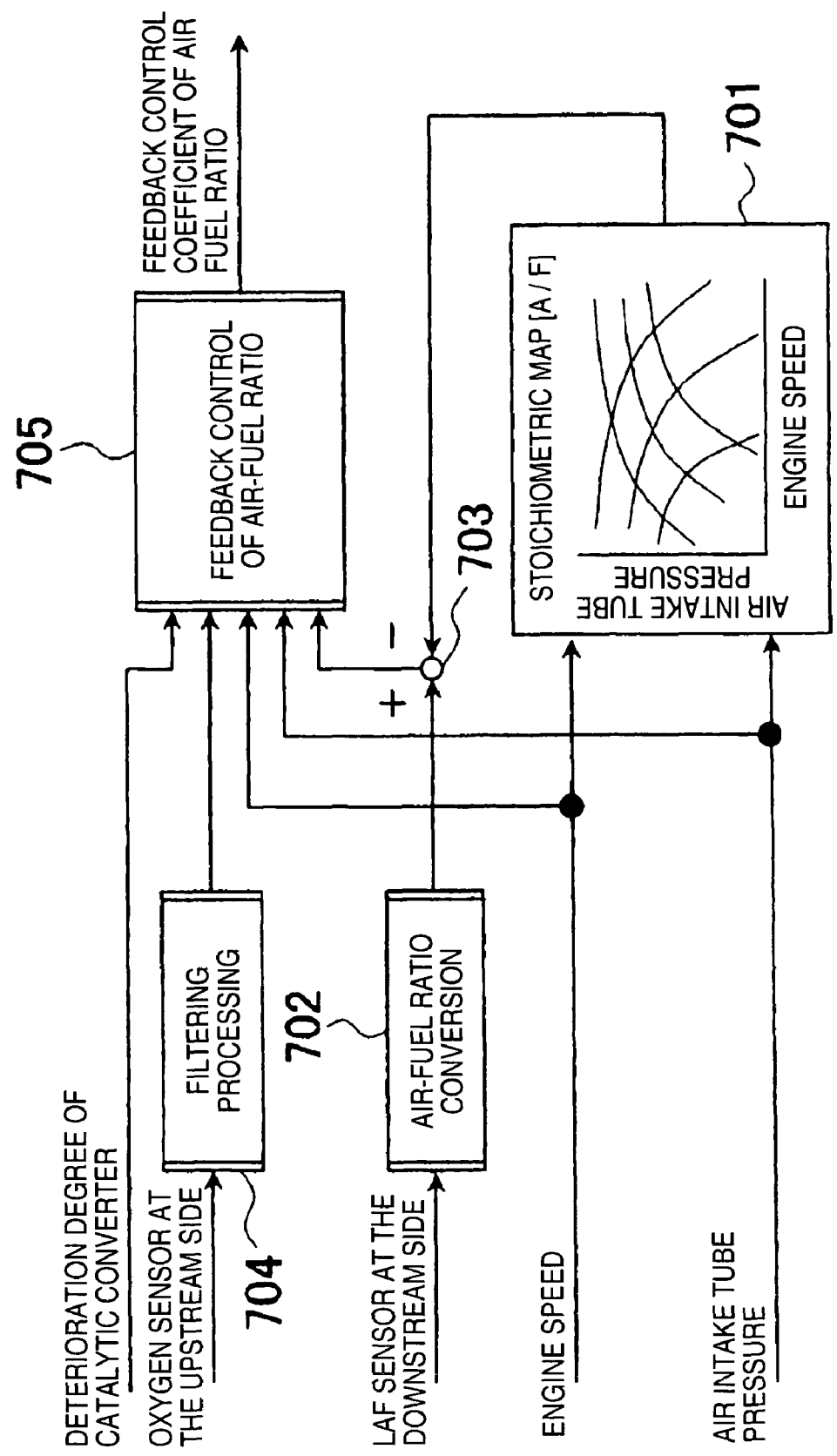
FIG. 7 is a block diagram showing one embodiment of feedback control of air-fuel ratio in an apparatus for controlling air-fuel ratio according to the present invention.

Then, one embodiment of air-fuel ratio feedback control by the engine control apparatus 250 is explained by referring to FIG. 7.

In this air-fuel ratio feedback control, the stoichiometric area A/F map memory 701, which stores the stoichiometric area A/F map is used, wherein the stoichiometric area air-fuel ratio at the downstream side of the catalytic converter is set based on engine speed and air intake tube pressure, and the stoichiometric area air-fuel ratio corresponding to measured value of engine speed and air intake tube pressure to be input is retrieved from the data map.

The voltage signal (sensor signal), which the air-fuel ratio sensor at the downstream side of the catalytic converter (LAF sensor at the downstream side) 214 outputs, is converted to a signal showing air-fuel ratio by the air-fuel ratio conversion unit 702.

The stoichiometric area air-fuel ratio retrieved from the data map, and air-fuel ratio converted by the air-fuel ratio conversion unit 702 are input to the adder 703.

The adder (deviation calculation unit) 703 calculates difference air-fuel ratio (control deviation) between the stoichiometric area air-fuel ratio retrieved from the map (control target value) and air-fuel ratio (measured value) by the output signal of the air-fuel ratio sensor 214. Hereinafter, this deviation air-fuel ratio may be referred to as the stoichiometric area difference air-fuel ratio.

The output voltage of the oxygen sensor at the upstream side of the catalytic converter (oxygen sensor at the upstream side) 213 is subjected to filtering by weighted average, and the like, by the filtering processing unit 704.

The air-fuel ratio feedback control unit 705 calculates air-fuel ratio feedback control based on engine speed, air intake tube pressure, difference air-fuel ratio, oxygen sensor voltage filtering value and deterioration degree of the catalytic converter, and outputs feedback control coefficient of air-fuel ratio. This air-fuel ratio feedback controlling unit fundamentally carries out air-fuel ratio feedback control according to difference value between the output signal of the oxygen sensor 213, and the threshold value which is set according to the stoichiometric area difference air-fuel ratio (deviation) calculated by the adder 703.

Figure 8:
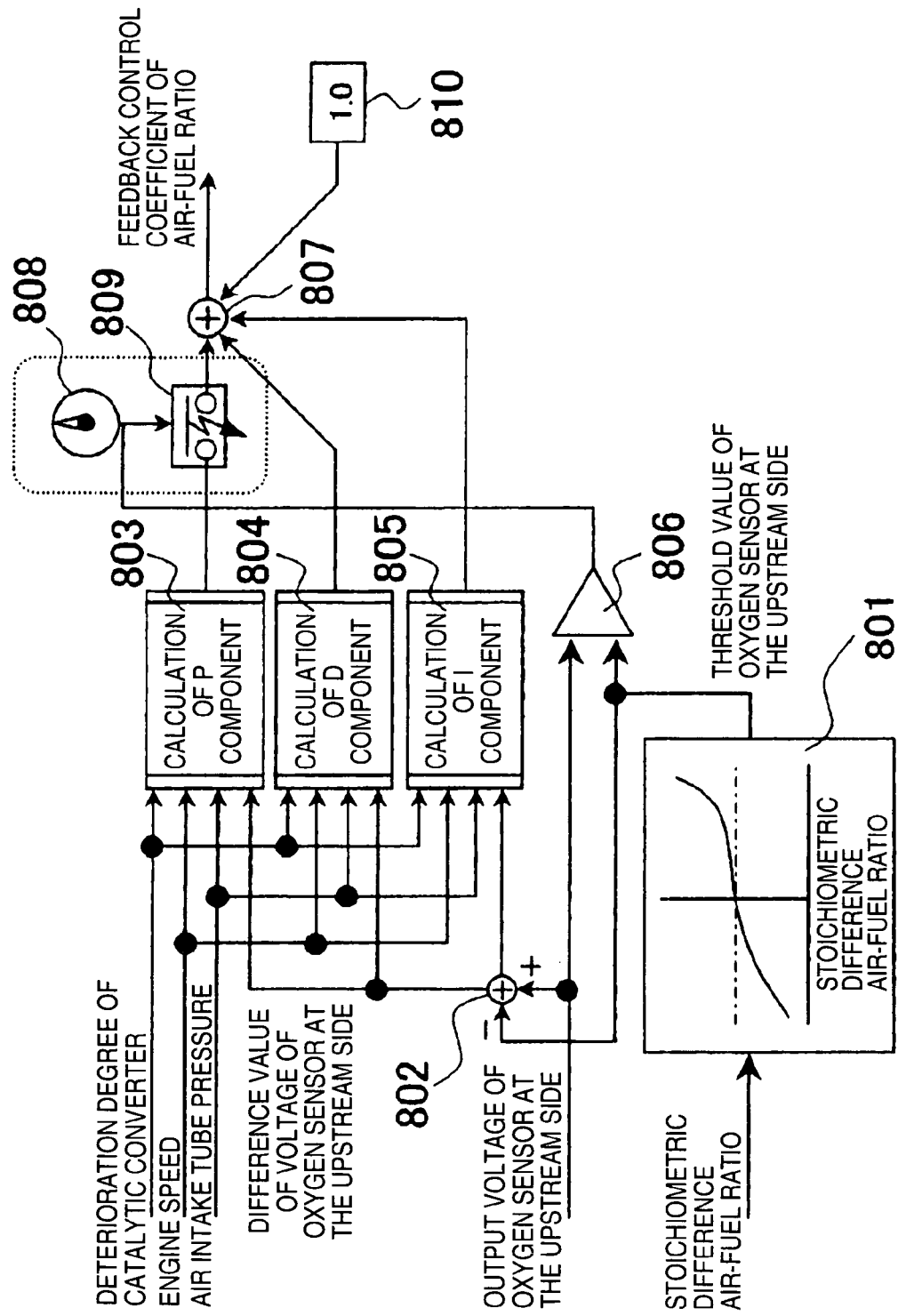
FIG. 8 is a block diagram showing one detailed embodiment of a feedback control unit of air-fuel ratio in an apparatus for controlling air-fuel ratio according to the present invention.

One embodiment of detail of the air-fuel ratio feedback control unit 705 is explained by referring to FIG. 8.

The air-fuel ratio feedback control unit 705 has the data table memory 801, the adder 802, the proportional component (proportional operation variable) calculation unit 803, the differential component (differential operation variable) calculation unit 804, the integral component (integral operation variable) calculation unit 805, the comparator 806, the adder 807, the timer 808, the switch 809, and the constant number setup unit 810.

The data table memory 801 memorizes data table of threshold values of the oxygen sensor at the upstream side, which defines relation between the stoichiometric area difference air-fuel ratio and threshold values of the oxygen sensor at the upstream side, and retrieves threshold values of the oxygen sensor at the upstream side, from difference air-fuel ratio, using this data table memory 801.

The adder 802 calculates difference value between threshold values of the oxygen sensor at the upstream side by retrieval from the table, and the output voltage filtering value of the oxygen sensor at the upstream side.

The proportional component (P) calculation unit 803, the differential component (D) calculation unit 804, and the integral component (I) calculation unit 805 are control variable calculation units, and each is input engine speed, air intake tube pressure, difference value of voltage of the oxygen sensor at the upstream side and deterioration degree of the catalytic converter 212, to calculate PID operation.

The adder 807 adds center value (1.0) of feedback control coefficient of air-fuel ratio given by the constant number setup unit 810, the proportional component, the differential component and the integral component all together to output feedback control coefficient of air-fuel ratio.

In this connection, the proportional component (P) is composed so as to be added only in a specified period of time after the output of the oxygen sensor at the upstream side crosses the threshold value of the oxygen sensor at the upstream side, by the comparator 806, the timer 808 and the switch 809.

Figure 9:
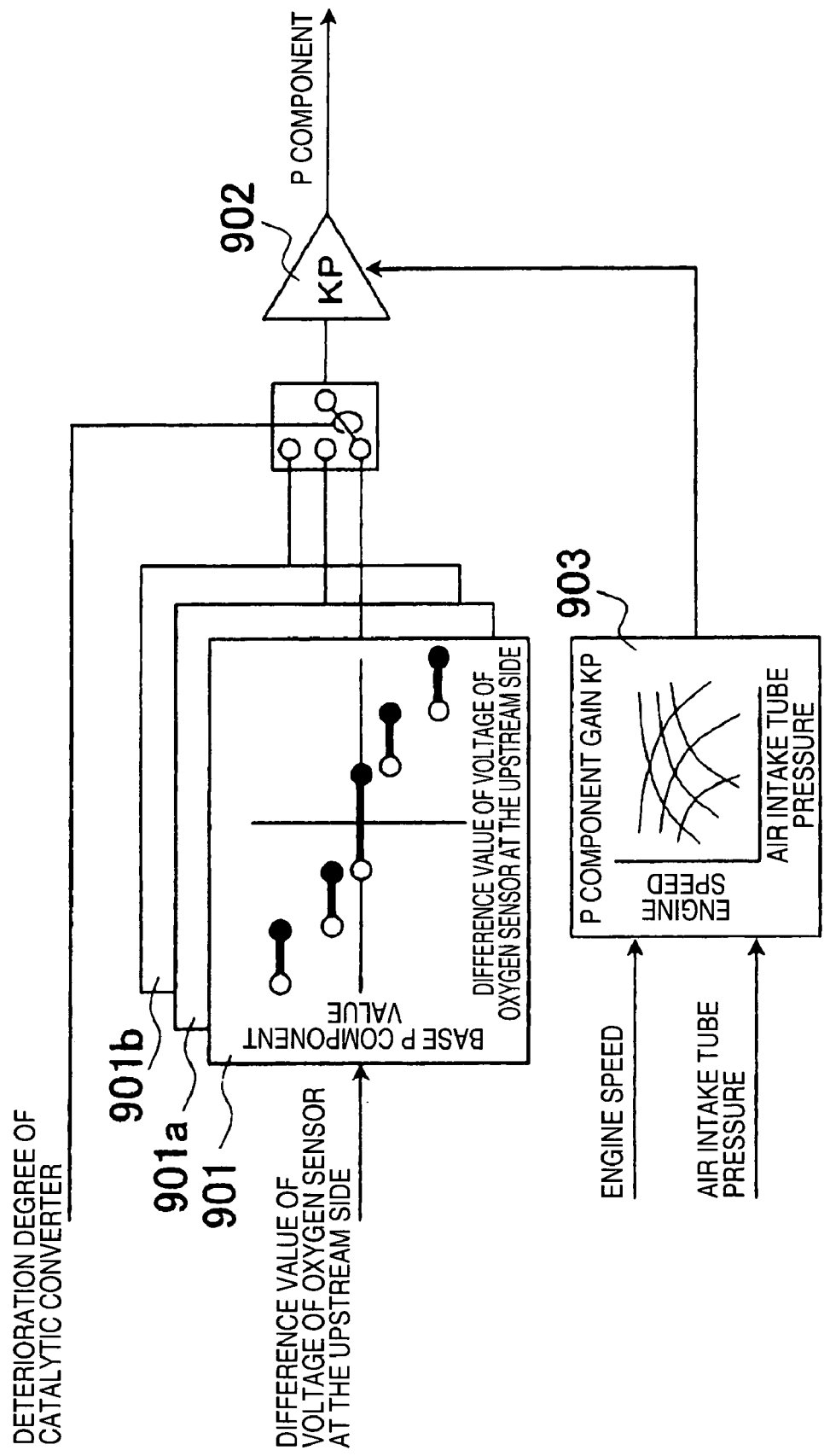
FIG. 9 is a block diagram showing detail of a proportional component calculation unit of a feedback control unit of air-fuel ratio according to one embodiment.

The proportional component calculation unit 803, as shown in FIG. 9, switches the base proportional component value data tables 901, 901a and 901b, depending on deterioration degree of the catalytic converter 212, retrieves from the table the base proportional component value, responsive to the difference value of voltage of the oxygen sensor at the upstream side, retrieves from the map the proportional component gain KP, according to engine speed and air intake tube pressure, by the proportional component gain map 903, and outputs the proportional component by multiplying the base proportional component value and the proportional component gain KP by the calculator 902.

In this connection, in the present embodiment, value without interpolated value is retrieved for the difference value of voltage of the oxygen sensor at the upstream side.

Figure 10:
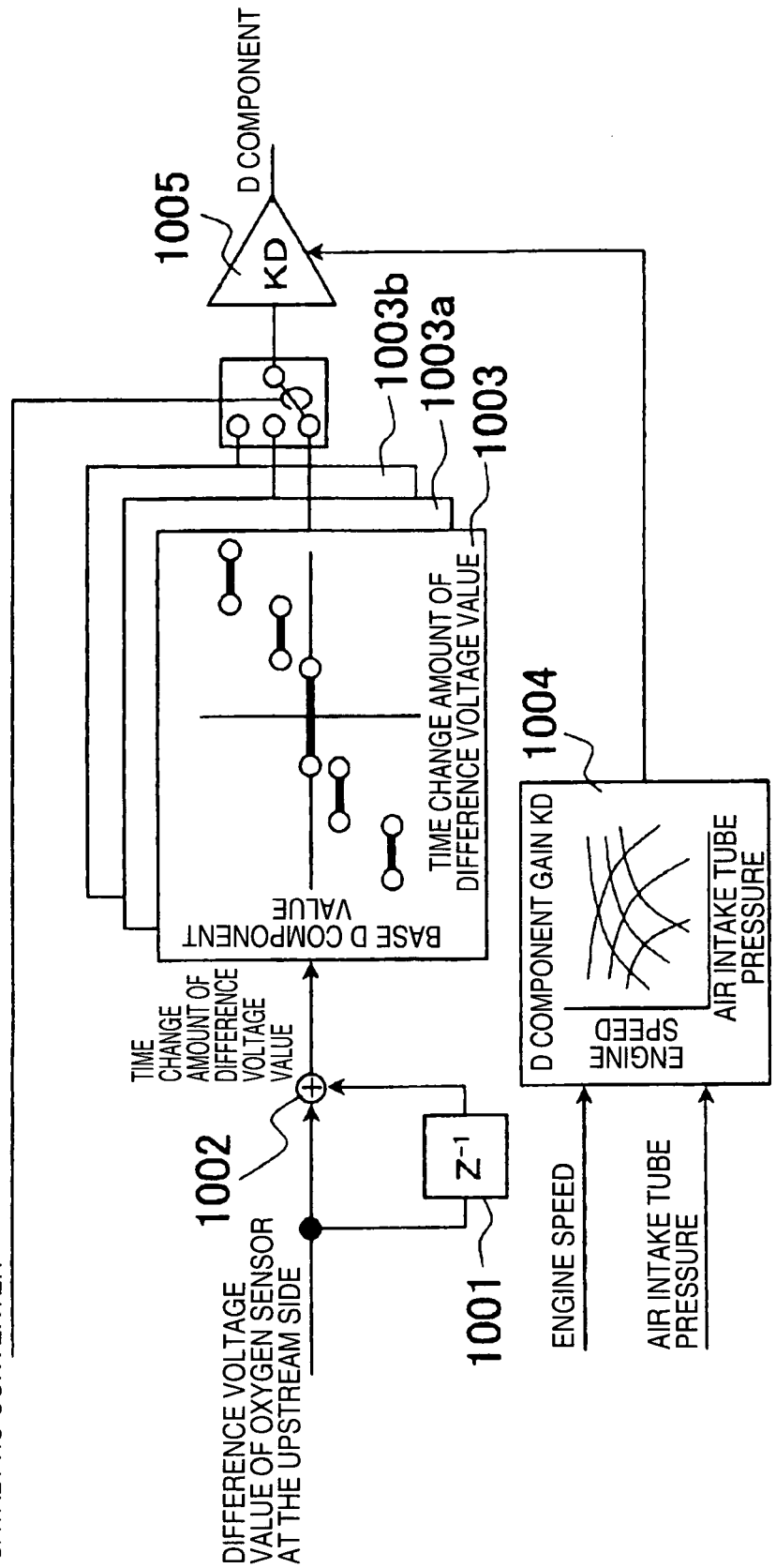
FIG. 10 is a block diagram showing detail of a differential component calculation unit of a feedback control unit of air-fuel ratio according to one embodiment.

The differential component calculation unit 804, as shown in FIG. 10, calculates time change amount of the difference value of voltage of the oxygen sensor at the upstream side, by the delay device 1001 and the adder 1002, switches the base differential component value data tables 1003, 1003a and 1003b, depending on deterioration degree of the catalytic converter 212, retrieves from the table the base differential component value without interpolating, based on time change amount of the difference value of voltage of the oxygen sensor at the upstream side.

Then, the differential component gain KD is retrieved from the map, depending on engine speed and air intake tube pressure, by the differential component gain map 1004, and outputs the differential component by multiplying the base differential component value and the differential component gain KD, by the calculator 1005.

Figure 11:
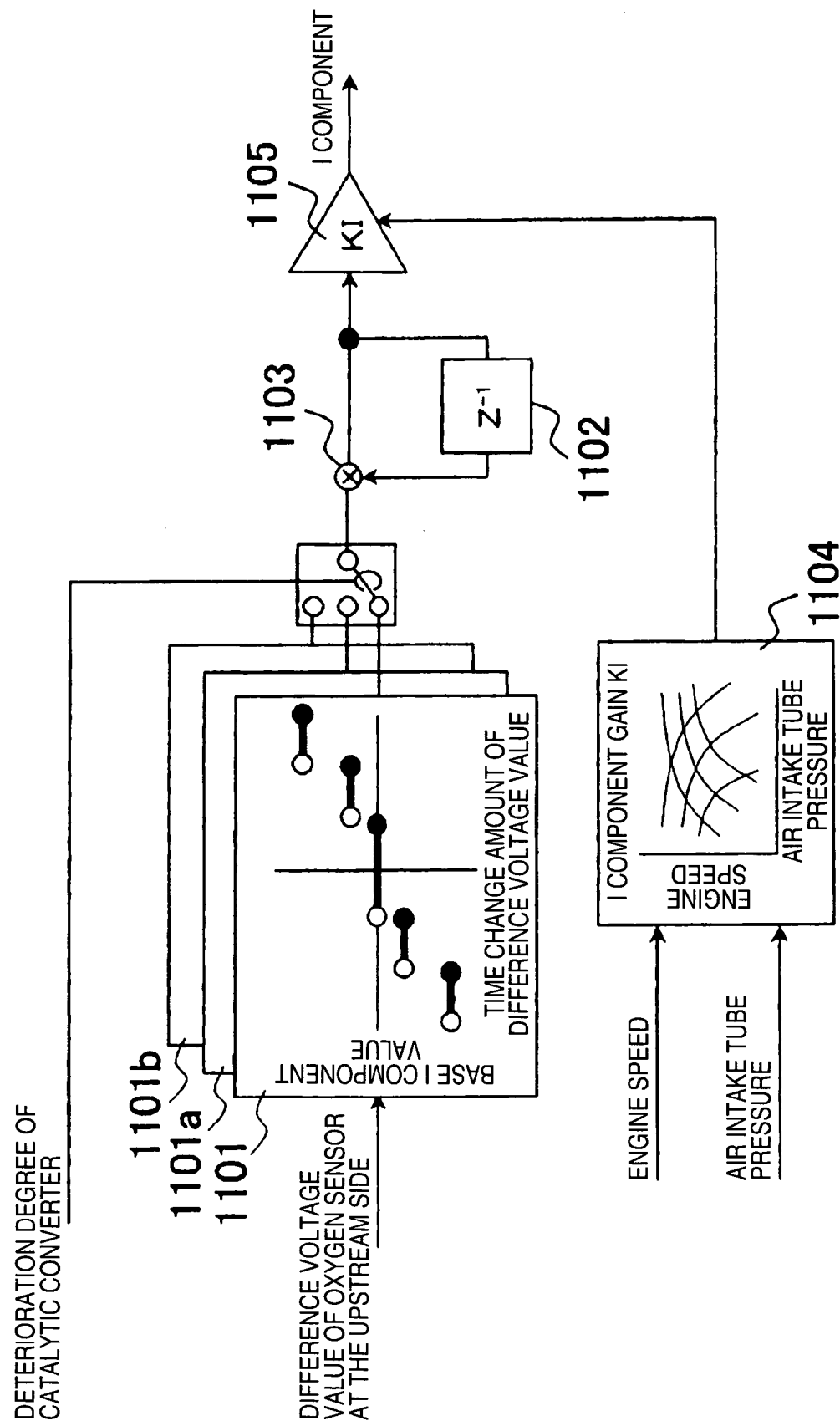
FIG. 11 is a block diagram showing detail of an integral component calculation unit of a feedback control unit of air-fuel ratio according to one embodiment.

The integral component (integral operation variable) calculation unit 805, as shown in FIG. 11, switches the base integral component value data tables 1101, 1101a and 1101b, depending on deterioration degree of the catalytic converter 212, and retrieves from the table the base integral component without interpolating, according to the difference value of voltage of the oxygen sensor at the upstream side, and integrates the base integral component retrieved, by the delay device 1102 and the adder 1103. Then, the integral component gain KI is retrieved from the map, by the integral component gain map 1104, according to engine speed and air intake tube pressure, and outputs the integral component by multiplying the base integral component value which is integrated by the calculator 1105, and the integral component gain KI.

Figure 12:
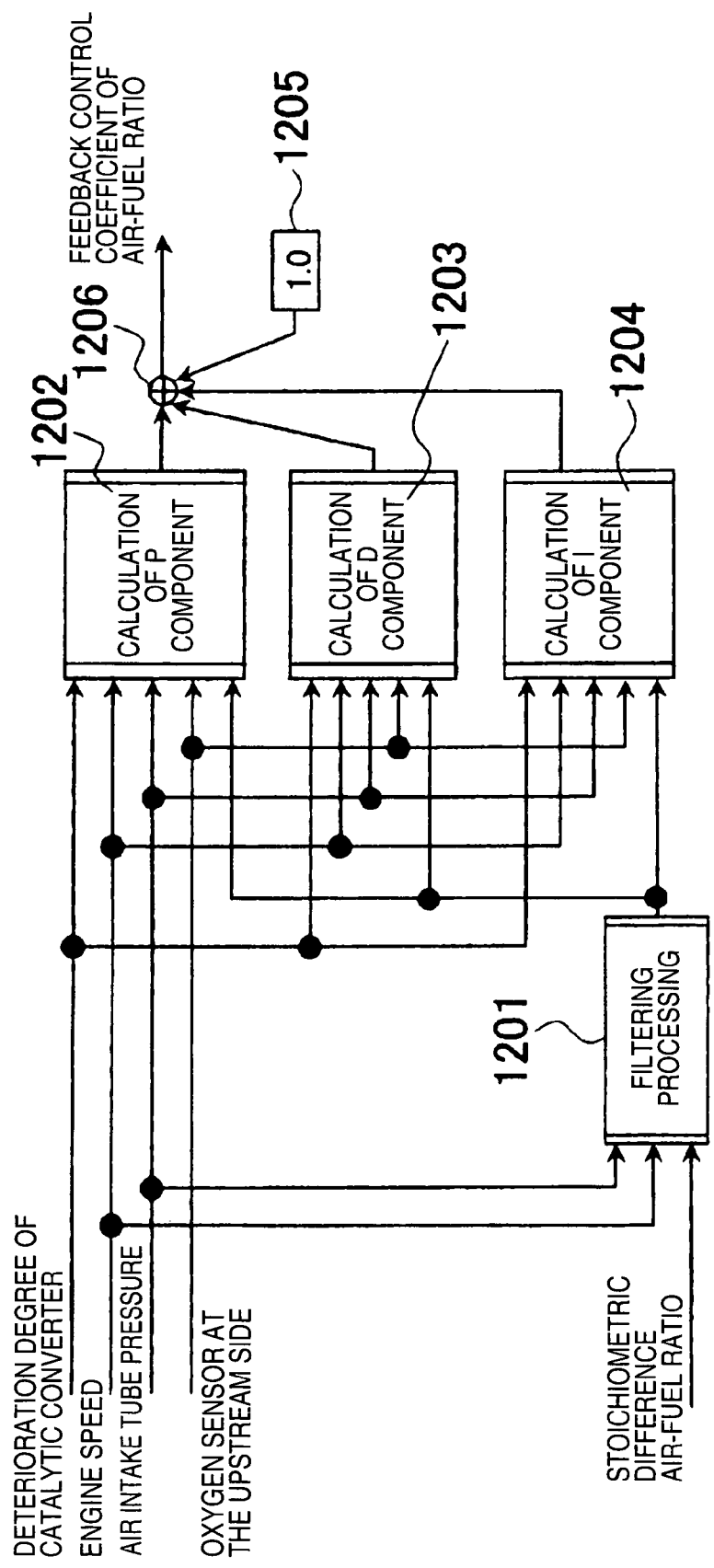
FIG. 12 is a block diagram showing other detailed embodiment of a feedback control unit of air-fuel ratio in an apparatus for controlling air-fuel ratio according to the present invention.

Other embodiment of detail of the air-fuel ratio feedback control unit 705 is explained by referring to FIG. 12. The air-fuel ratio feedback control unit 705 has the filtering processing unit 1201, the proportional component (proportional operation variable) calculation unit 1202, the differential component (differential operation variable) calculation unit 1203, the integral component (integral operation variable) calculation unit 1204, the constant number setup unit 1205, and the adder 1206.

The filtering processing unit 1201 furnishes filtering to the stoichiometric area difference air-fuel ratio, based on engine speed and air intake tube pressure.

The proportional component (proportional operation variable) calculation unit 1202, the differential component (differential operation variable) calculation unit 1203, and the integral component (integral operation variable) calculation unit 1204 are control variable calculation units, and each is input engine speed, air intake tube pressure, difference value of voltage of the oxygen sensor at the upstream side, and deterioration degree of the catalytic converter 212, and calculates PDI operation.

The adder 1206 adds center value (1.0) of feedback control coefficient of air-fuel ratio given by the constant number setup unit 1205, the proportional component, the differential component and the integral component, and outputs feedback control coefficient of air-fuel ratio.

Figure 13:
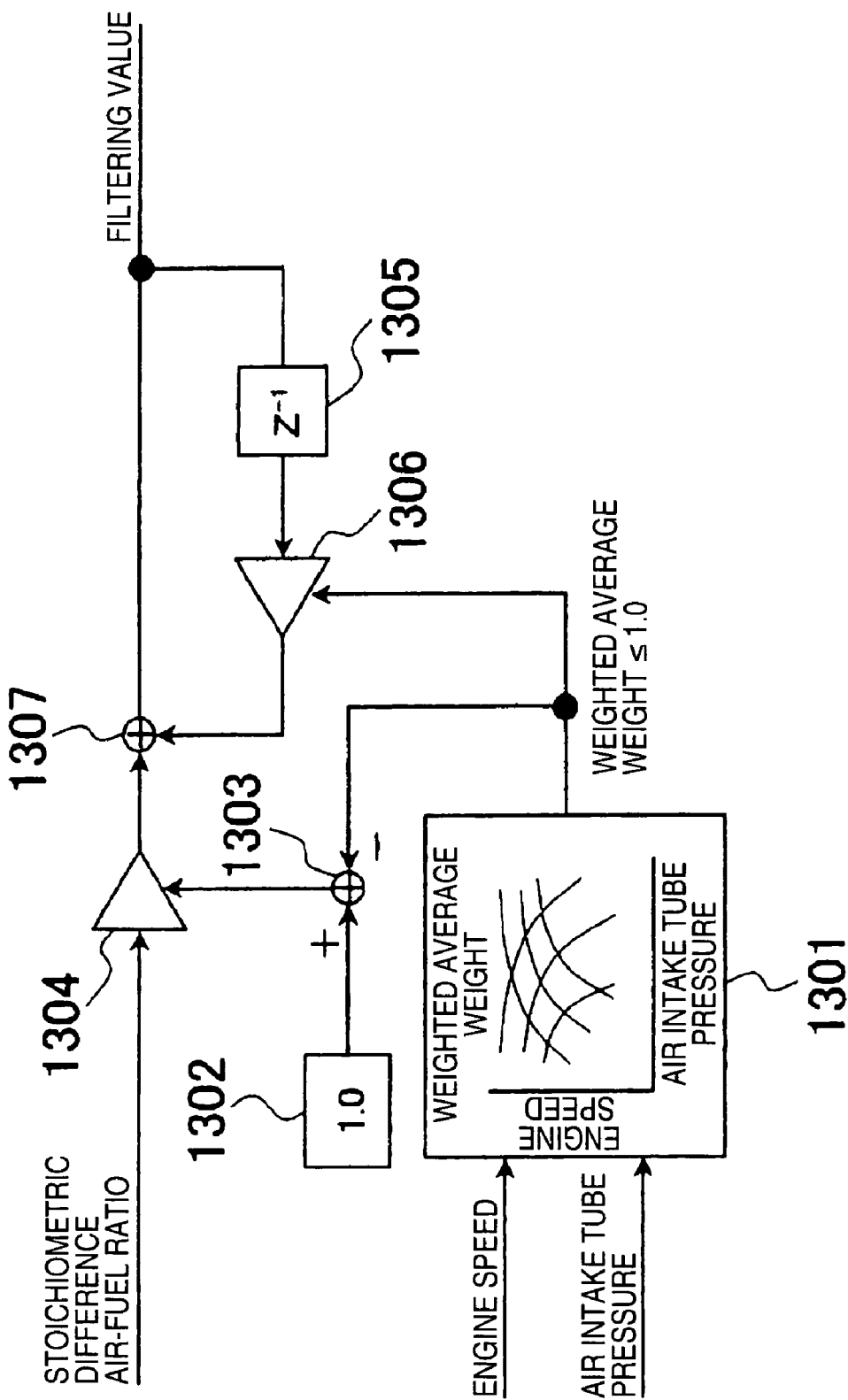
FIG. 13 is a block diagram showing detail of a filtering processing unit of a feedback control unit of air-fuel ratio according to one embodiment.

The filtering processing unit 1201, as shown in FIG. 13, retrieves from the map, weighted average weight (weighted average weight≦1.0) according to engine speed and air intake tube pressure, by the weighted average weight map 1301. The adder 1303 calculates difference value between set value (1.0) by the constant number setup unit 1302, and weighted average weight by retrieval from the map.

This difference value is multiplied to the stoichiometric area difference air-fuel ratio by the calculator 1304. Then, the previous filtering value of the stoichiometric area difference air-fuel ratio is multiplied by weighted average, by the delay device 1305 and the multiplier 1306, and added with each multiplied value with weight by the adder 1307, and outputs filtering value of the stoichiometric area difference air-fuel ratio.

Figure 14:
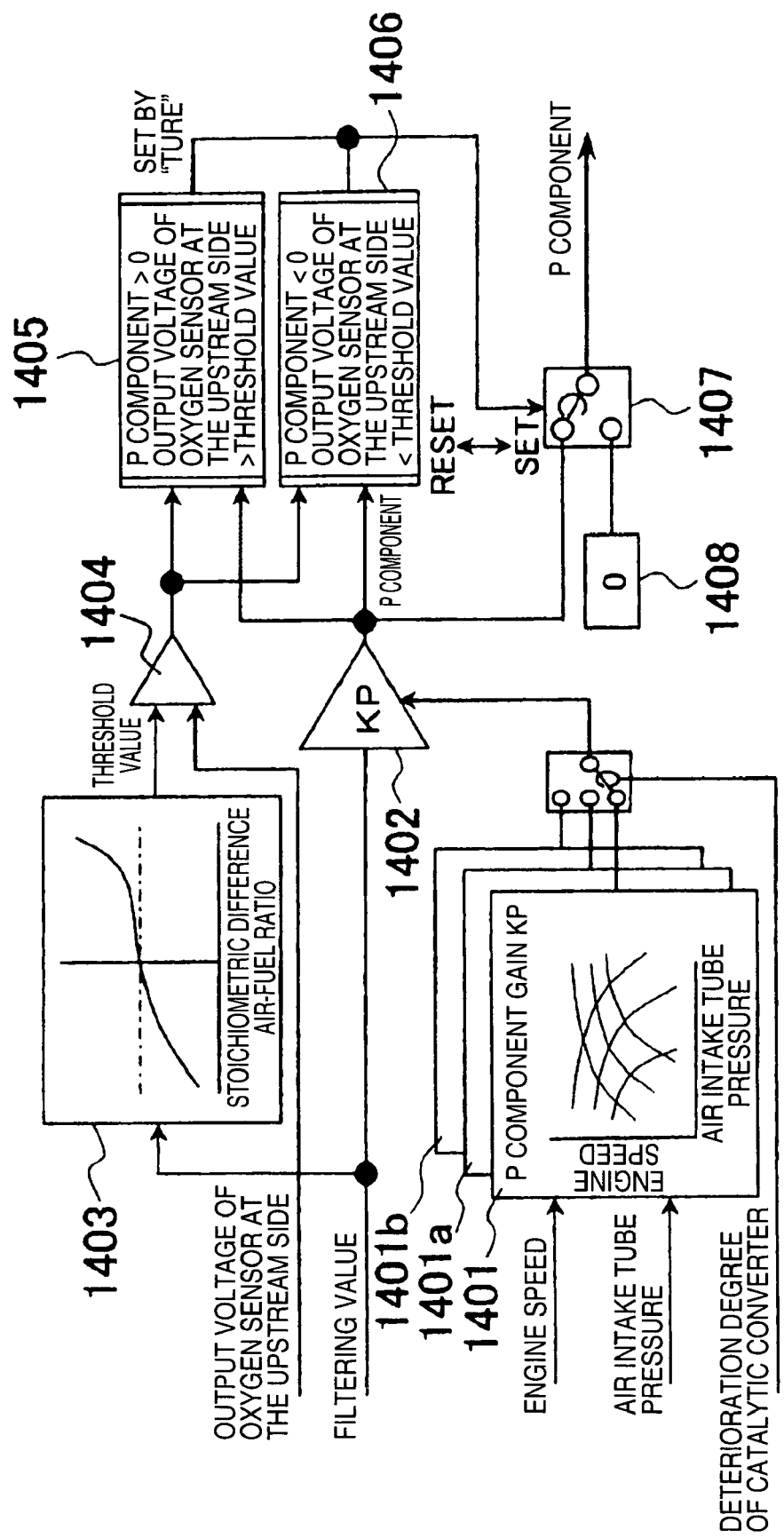
FIG. 14 is a block diagram showing detail of a proportional component calculation unit of a feedback control unit of air-fuel ratio according to other embodiment.

The proportional component calculation unit 1202, as shown in FIG. 14, switches the proportional gain maps 1401, 1401a and 1401b, depending on deterioration degree of the catalytic converter 212 and retrieves from the map, the proportional component gain KP, according to engine speed and air intake tube pressure. Then, the proportional component is output by multiplying the filtering value of the stoichiometric area difference air-fuel ratio with the proportional component gain KP by the calculator 1402.

The output voltage threshold value of the oxygen sensor at the upstream side is retrieved from the data table 1403, by the filtering value of the difference air-fuel ratio, to judge whether the output voltage of the oxygen sensor at the upstream side is larger than the threshold value retrieved from the table or not, by the comparator 1404.

The judgment processing units (reflection judgment units) 1405 and 1406 are judgment blocks for judging whether a proportional component should be output by the calculator 1402, or set value (zero) should be output (reflected to air-fuel ratio feedback control) by the constant number setup unit 1408, and output switching is carried out by the switch 1407, based on judgment of these judgment processing units 1405 and 1406.

Judgment that the proportional component should not be output is for the cases that the proportional component is larger than zero, and voltage of the oxygen sensor at the upstream side is larger than the threshold value, and for the case that the proportional component is smaller than zero, and voltage of the oxygen sensor at the upstream side is smaller than the threshold value.

Figure 15:
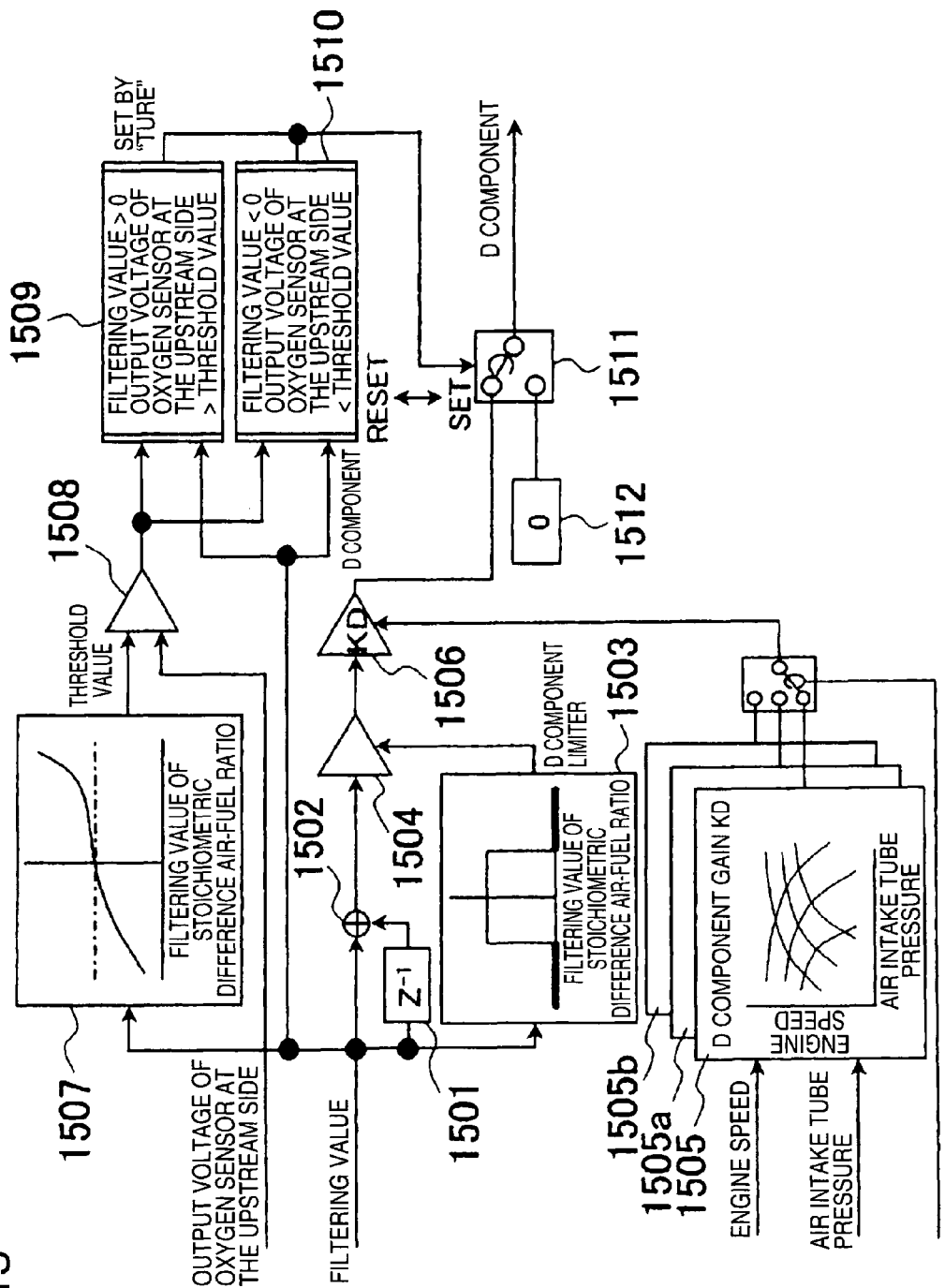
FIG. 15 is a block diagram showing detail of a differential component calculation unit of a feedback control unit of air-fuel ratio according to other embodiment.

The differential component calculation unit 1203, as shown in FIG. 15, calculates time change amount of the filtering value of the stoichiometric area difference air-fuel ratio, by the delay device 1501 and the adder 1502.

Non-linear limiter value as shown in the Fig. is retrieved according to the filtering value of the stoichiometric area difference air-fuel ratio, from the limiter value data table 1503, to furnish limiter to time change amount of the filtering value, by the differential component limiter 1504.

The differential component gain maps 1505, 1505*a* and 1505*b* are switched depending on deterioration degree of the catalytic converter 212 to retrieve from the map the differential component gain KD, based on engine speed and air intake tube pressure. Then, the differential component is determined by multiplying time change amount of the filtering value of the stoichiometric area difference air-fuel ratio, which is subjected to limiter by the calculator 1506, with the differential component gain KD.

The output voltage threshold value of the oxygen sensor at the upstream side is retrieved from the data table 1507, based on the filtering value of the difference air-fuel ratio, to judge whether the output voltage of the oxygen sensor at the upstream side is larger than the threshold value or not, by the comparator 1508.

The judgment processing units (reflection judgment units) 1509 and 1510 are judgment blocks for judging whether a differential component by the calculator 1506 should be output, or set value (zero) by the constant number setup unit 1512 should be output (reflected to feedback control of air-fuel ratio), and output switching is carried out by the switch 1511, based on judgment of these judgment processing units 1509 and 1510.

Judgment that the differential component should not be output is for the cases that the filtering value of the stoichiometric area difference air-fuel ratio is larger than zero, and voltage of the oxygen sensor at the upstream side is larger than the threshold value, and that the filtering value of the stoichiometric area difference air-fuel ratio is smaller than zero, and voltage of the oxygen sensor at the upstream side is smaller than the threshold value.

Figure 16:
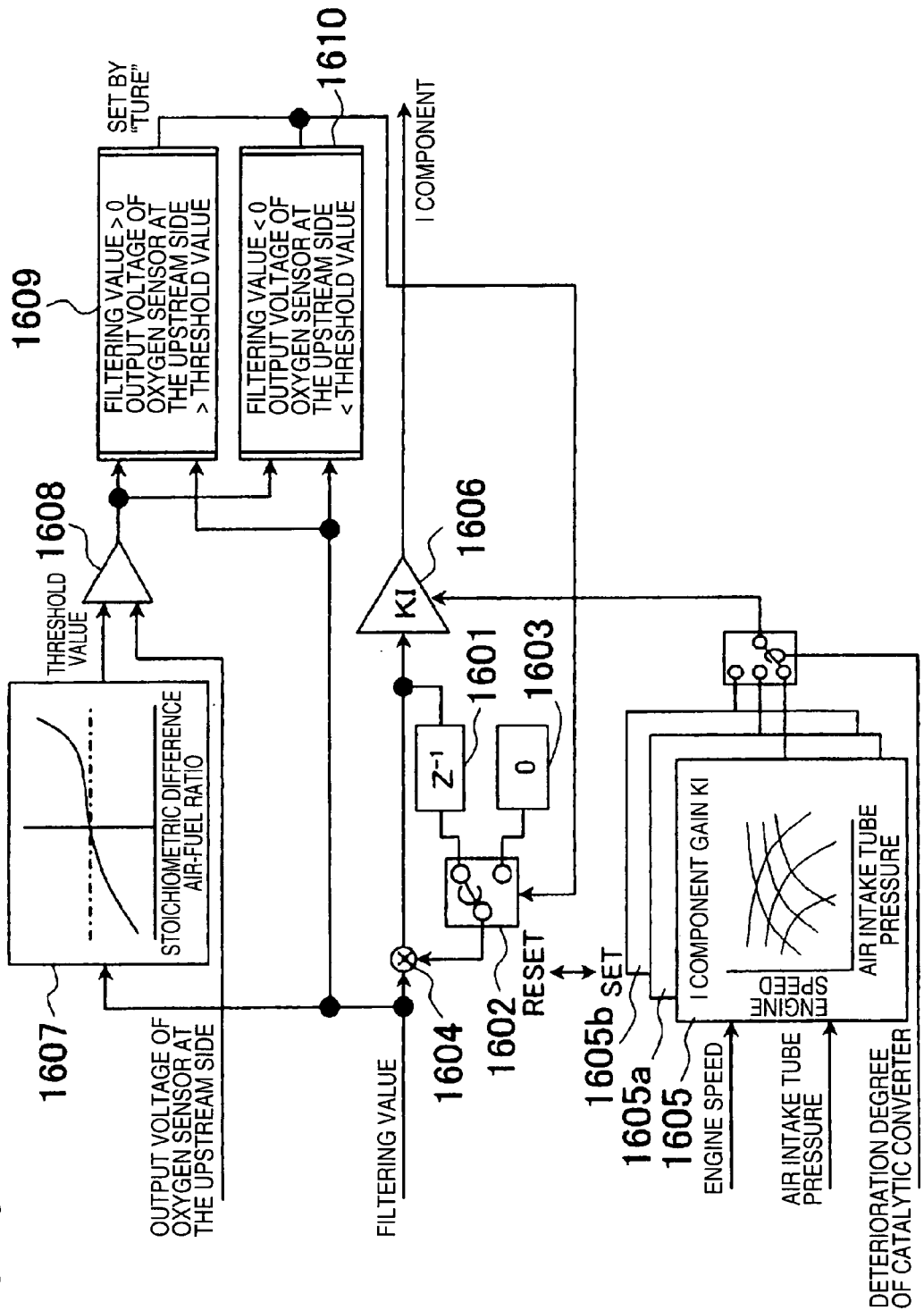
FIG. 16 is a block diagram showing detail of an integral component calculation unit of a feedback control unit of air-fuel ratio according to other embodiment.

The integral component calculation unit 1204, as shown in FIG. 16, selects whether integration value of the previous filtering value should be added to the filtering value of the stoichiometric area difference air-fuel ratio, by the delay device 1601, the switch 1602, the constant number setup unit 1603, and the adder 1604, or constant value should be added.

In this connection, in the present embodiment, because constant number of the constant number setup unit 1603 is set to be zero, integration of the filtering value is stopped, when the switch 1602 switches to select constant number.

The integral component gain maps 1605, 1605*a* and 1605*b* are switched, depending on deterioration degree of the catalytic converter, to retrieve from the map the integral component gain KI, based on engine speed and air intake tube pressure. Then, the integral component is determined by multiplying the filtering integral value of the stoichiometric area difference air-fuel ratio with the integral component gain KI by the calculator 1606.

The output voltage threshold value of the oxygen sensor at the upstream side is retrieved from the data table 1607, based on the filtering value of the difference air-fuel ratio, to judge whether the output voltage of the oxygen sensor at the upstream side is larger than the threshold value retrieved by the table or not, by the comparator 1608.

The judgment processing units (reflection judgment units) 1609 and 1610 carry out the switching judgment of the switch 1602. Judgment to select constant number (stop of integration because of setting to zero) instead of using the previous filtering integral value as integration to the filtering value is for the cases that the filtering value of the stoichiometric area difference air-fuel ratio is larger than zero, and voltage of the oxygen sensor at the upstream side is larger than the threshold value, and for the cases that the filtering value of the stoichiometric area difference air-fuel ratio is smaller than zero, and voltage of the oxygen sensor at the upstream side is smaller than the threshold value.

For the cases other than the above ones, integral value of the previous filtering value is integrated to the new filtering value (reflected to feedback control of air-fuel ratio).

In the present embodiment, for example, even when feedback by the air-fuel ratio sensor 214 at the downstream side of the catalytic converter indicates correction of fuel to a rich side, feedback reflection is set not to be operated, when the oxygen sensor 213 at the upstream side of the catalytic converter shows a lean side. Therefore, overshoot of the air-fuel ratio at the upstream side of the catalytic converter can be prevented.

Figure 17:
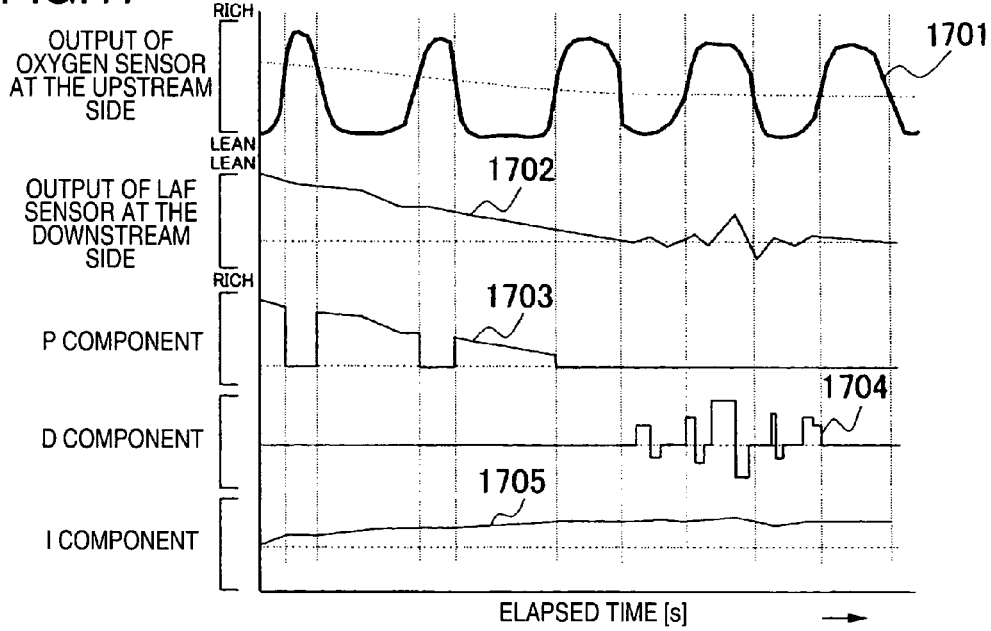
FIG. 17 is a time chart showing an example of behaviors of the output of each sensor and each variable of air-fuel ratio feedback control carried out by an air-fuel ratio feedback control unit according to other embodiment.

FIG. 17 shows an example of behaviors of the output of each sensor and each variable, in feedback control of air-fuel ratio carried out by the air-fuel ratio feedback control unit 705 according to the embodiment shown in FIG. 12.

The characteristics line 1701 shows output voltage behavior of the oxygen sensor 213 at the upstream side of the catalytic converter, the characteristics line 1702 shows air-fuel ratio behavior of the air-fuel ratio sensor 204 at the downstream side of the catalytic converter, the characteristics line 1703 shows the proportional component behavior of the feedback control of air-fuel ratio, the characteristics line 1704 shows the differential component behavior of the feedback control of air-fuel ratio, and the characteristics line 1705 shows the integral component behavior of the feedback control of air-fuel ratio.

Figure 18:
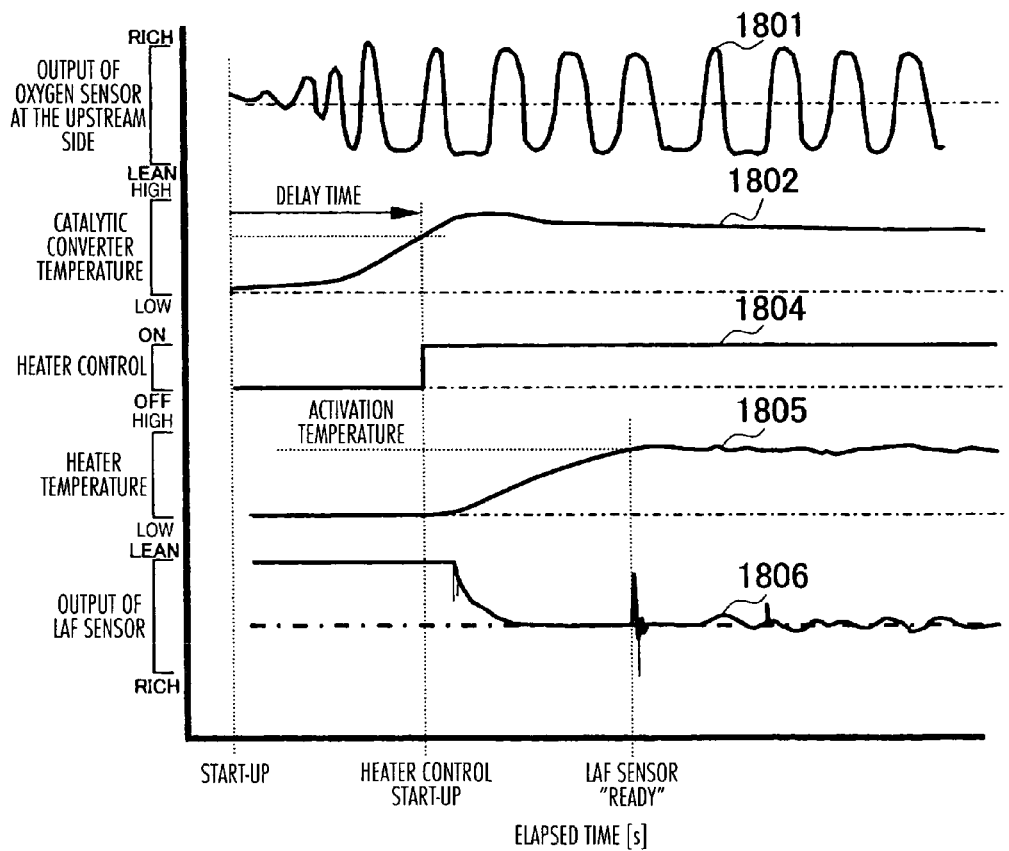
FIG. 18 is a time chart showing an example of the output voltage behavior of an oxygen sensor at the upstream side of a catalytic converter, and start-up behavior of an air-fuel ratio sensor at the downstream side of a catalytic converter, in engine start-up of an engine control apparatus carrying out air-fuel ratio control of the present embodiment.

FIG. 18 shows an example of the output voltage behavior of the oxygen sensor at the upstream side of the catalytic converter, and start-up behavior of the air-fuel ratio sensor at the downstream side of the catalytic converter of the engine control apparatus 250 at the engine start-up, wherein air-fuel ratio control of the present embodiment is carried out.

The characteristic line 1801 shows the output behavior of the oxygen sensor 213 at the upstream side of the catalytic converter, from the start-up of an engine. The output of the oxygen sensor at the upstream side shows small reverse amplitude just after start-up, however, normal reverse amplitude is obtained with engine warm-up.

The characteristic line 1802 shows the temperature behavior of the catalytic converter 212. Catalytic converter temperature is gradually raised with engine warm-up.

The characteristic line 1804 shows a heater control state of the air-fuel ratio sensor 214. In this heater control, the heater is driven, namely heater control is started, from the time when catalytic converter temperature shown by the characteristic line 1802 is at a specified temperature to eliminate moisture at the vicinity of the air-fuel ratio sensor, after a specified delay time has passed. The characteristic line 1805 shows heater temperature, and when heater temperature becomes a specified value (activated temperature), as shown by the characteristic line 1806, the output of the air-fuel ratio sensor becomes a "ready state", and feedback control becomes possible by adopting the output of the air-fuel ratio sensor 214.

By the above control, such effect is obtained that feedback control by adopting the output of the air-fuel ratio sensor 214 is rapidly started, without generating element fracture of the air-fuel ratio sensor 214, and the like.

Figure 19:
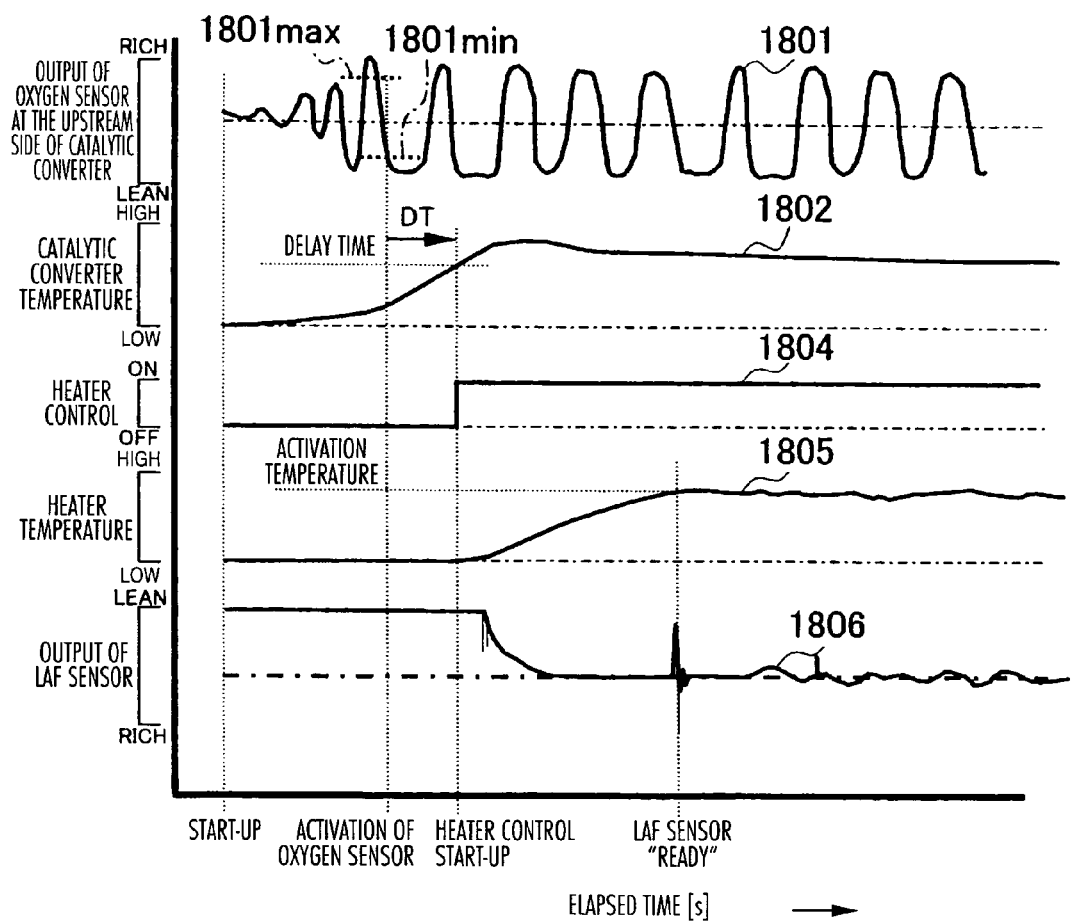
FIG. 19 is a time chart showing other example of the output voltage behavior of an oxygen sensor at the upstream side of a catalytic converter, and start-up behavior of an air-fuel ratio sensor at the downstream side of a catalytic converter, in engine start-up of an engine control apparatus carrying out air-fuel ratio control of the present embodiment.

FIG. 19 shows other example of the output voltage behavior of the oxygen sensor at the upstream side of the catalytic converter, and start-up behavior of the air-fuel ratio sensor at the downstream side of the catalytic converter of the engine control apparatus 250, at the engine start-up, wherein air-fuel ratio control of the present embodiment is carried out.

A different point from the time chart shown in the above-described FIG. 18 is that judgment of activation of the oxygen sensor 213 at the upstream side of the catalytic converter is made at the time when variation width of the output of the oxygen sensor 213 at the upstream side of the catalytic converter in the characteristic line 1801 is over a specified range (between the line 1801 max. and the line 1801 min.). Heater drive (heater control start) of the air-fuel ratio 214 at the downstream side of the catalytic converter is started after a specified delay time DT has passed from the time when the oxygen sensor 213 is judged to be activated (the time when the output of the oxygen sensor 213 is judged to be adoptable). Even in this case also, when heater temperature becomes a specified value (activation temperature), the output of the air-fuel ratio sensor becomes a "ready state", and feedback control by adopting the output of the air-fuel ratio sensor 214 becomes possible.

Also in this case, such effect is obtained that feedback control by adopting the output of the air-fuel ratio sensor 214 is rapidly started, without generating element fracture of the air-fuel ratio sensor 214, and the like.

Figure 20:
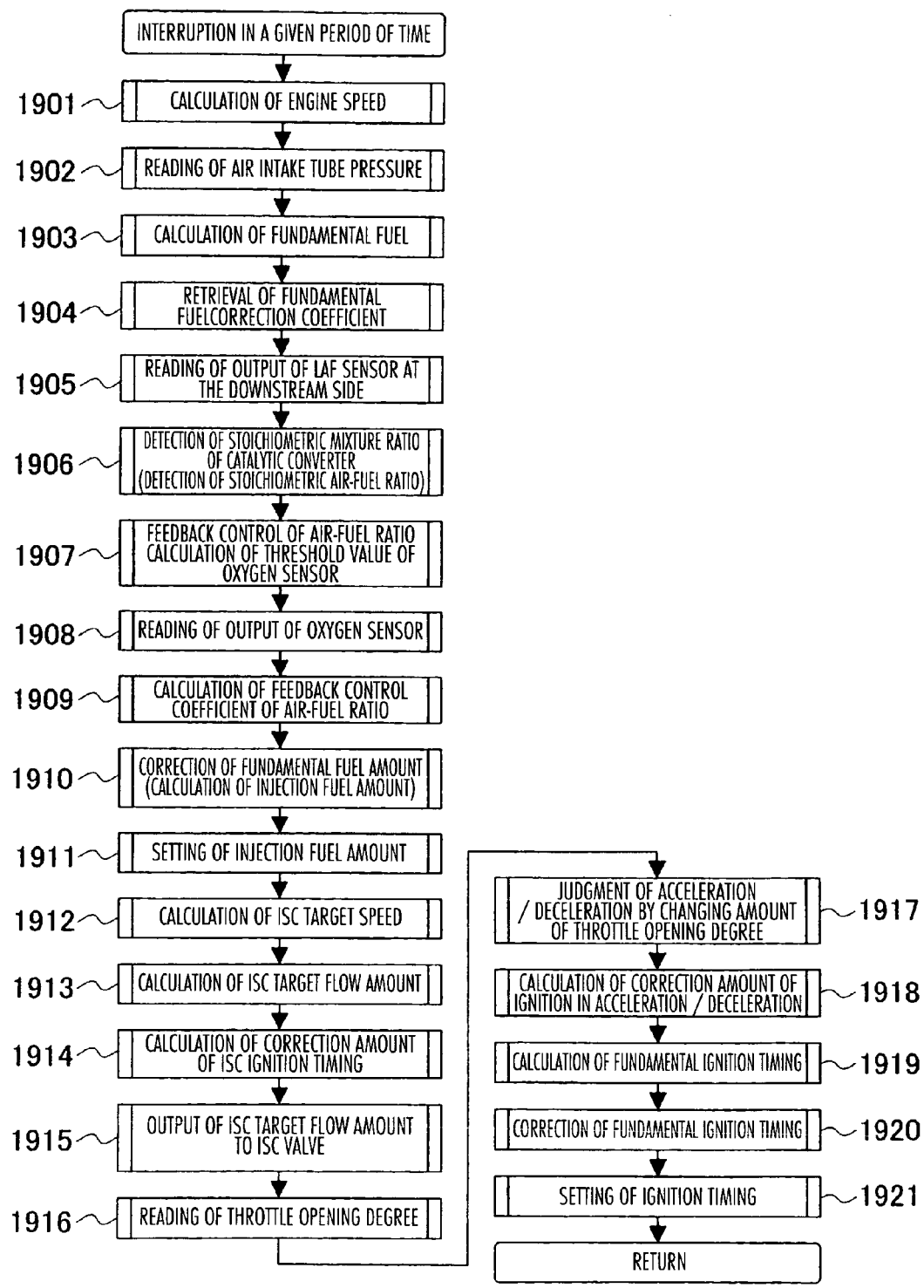
FIG. 20 is a flow chart showing control processing flow of an engine control apparatus carrying out air-fuel ratio control of the present embodiment.

Control processing flow carried out by the engine control apparatus 250 which adopts air-fuel ratio control according to the present embodiment is explained by referring to FIG. 20.

First of all, electric signals, mainly input number per unit time of pulse signal change, which the crank angle sensor 215 outputs, is counted to calculate engine speed by calculation processing (the step S1901). Then, air intake tube pressure is read by the output signal of the air intake tube pressure sensor 205 (the step S1902).

Then, the fundamental fuel amount is calculated based on engine speed and air intake tube pressure read (the step S1903). Next, fundamental fuel correction coefficient is retrieved using engine speed and air intake tube pressure read as retrieval keys (the step S1904).

Then, the output of air-fuel ratio 214 at the downstream side of the catalytic converter is read to carry out air-fuel ratio conversion (the step S1905). Next, the stoichiometric area air-fuel ratio of the catalytic converter 212 is retrieved using engine speed and air intake tube pressure read as retrieval keys (the step S1906).

Then, as feedback control of air-fuel ratio, first of all, the voltage threshold value of the oxygen sensor 213 at the upstream side of the catalytic converter is determined (the step S1907), and the output voltage of the oxygen sensor at the upstream side of the catalytic converter is read (the step S1908), to calculate feedback control coefficient of air-fuel ratio (the step S1909).

Then, the fundamental fuel amount is corrected by the fundamental fuel correction coefficient and the feedback control coefficient of air-fuel ratio (the step S1910), and the corrected fuel amount is set as injection fuel amount (the step S1911).

Then, target engine speed in idling is calculated (the step S1912), and target flow amount of the ISC valve 230 is calculated from the target speed (the step S1913). Next, ISC ignition timing correction amount is calculated (the step S1914) to suppress engine speed variation in idling. Then, the target flow amount of the ISC valve 203 is output to the ISC valve 203 (the step S1915) to control the ISC valve.

Then, throttle opening degree is read from the throttle opening degree sensor 216 (the step S1916), and time change amount of throttle opening degree read is determined to carry out acceleration/deceleration judgment (the step S1917). Next, based on the acceleration/deceleration judgment, the ignition timing correction amount in acceleration/deceleration is calculated (the step S1918).

Then, fundamental ignition timing is calculated (the step S1919), and by adding idling timing correction in idling and acceleration/deceleration to the fundamental ignition timing, the final ignition timing is determined (the step S1920). Then, this final ignition timing is set (the step S1921) to carry out ignition by required ignition timing.

Figure 21:
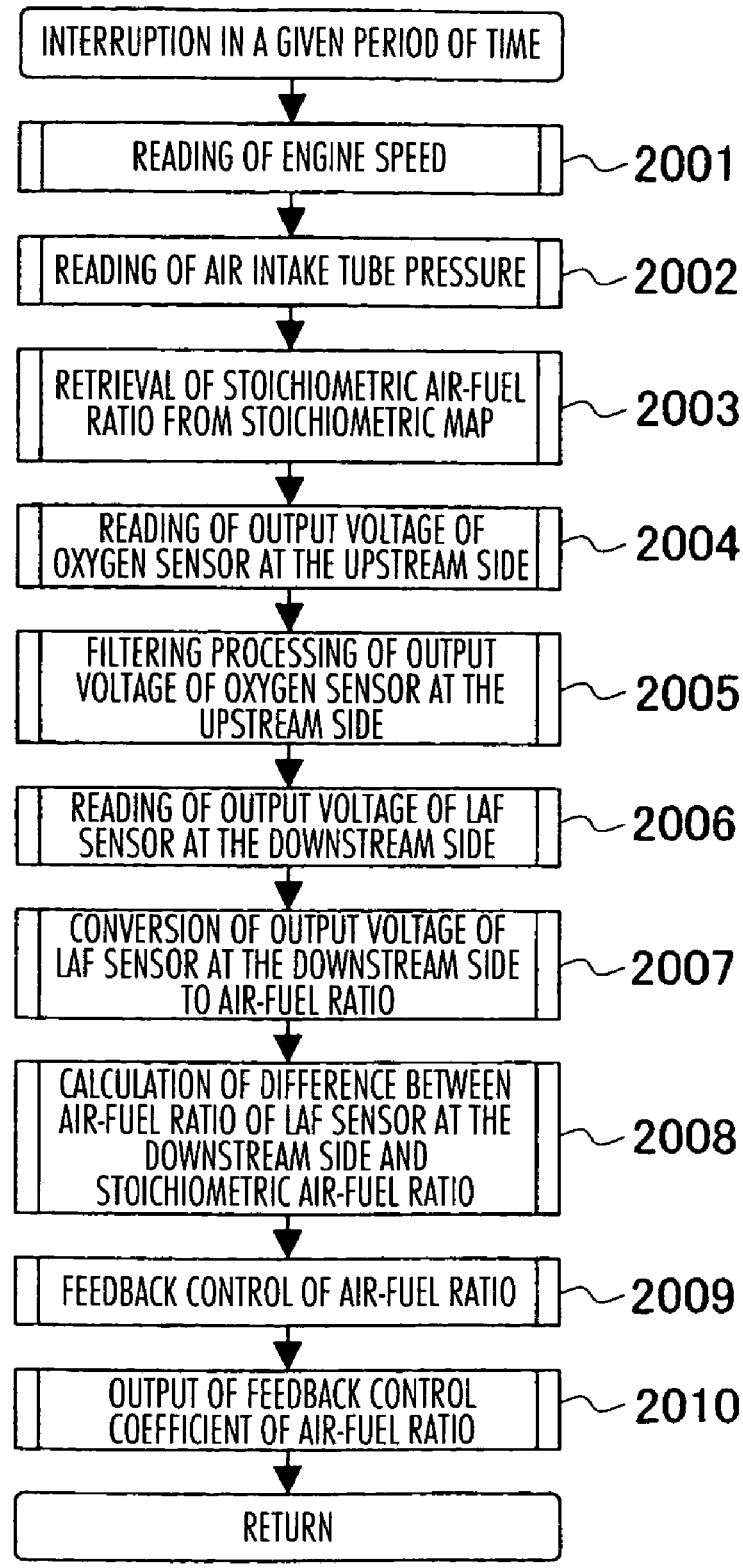
FIG. 21 is a flow chart showing detail of a processing flow of feedback control of air-fuel ratio according to the present embodiment.

Then, detailed processing flow of feedback control of air-fuel ratio according to the present embodiment is explained by referring to FIG. 21.

First of all, engine speed is read (the step S2001), and then air intake tube pressure is read (the step S2002).

Then, the stoichiometric area air-fuel ratio of the catalytic converter is retrieved from the map, by engine speed and air intake tube pressure read (the step S2003).

Then the output voltage of the oxygen sensor 213 at the upstream side of the catalytic converter is read (the step S2004), and filtering processing of the output voltage of the oxygen sensor read is carried out (the step S2005).

Then the output voltage of the air-fuel ratio sensor 214 at the downstream side of the catalytic converter is read (the step S2006), and the output voltage of the air-fuel ratio sensor read is converted to an air-fuel ratio value (the step S2007).

Then, difference value (the stoichiometric area difference value of air-fuel ratio of the catalytic converter) between the stoichiometric area air-fuel ratio of the catalytic converter retrieved from the map, and air-fuel ratio by the air-fuel ratio sensor 214 (measured value) is calculated (the step S2008), and feedback control coefficient of air-fuel ratio is calculated by air-fuel ratio feedback control (the step S2009) to output the feedback control coefficient of air-fuel ratio (the step S2010).

Figure 22:
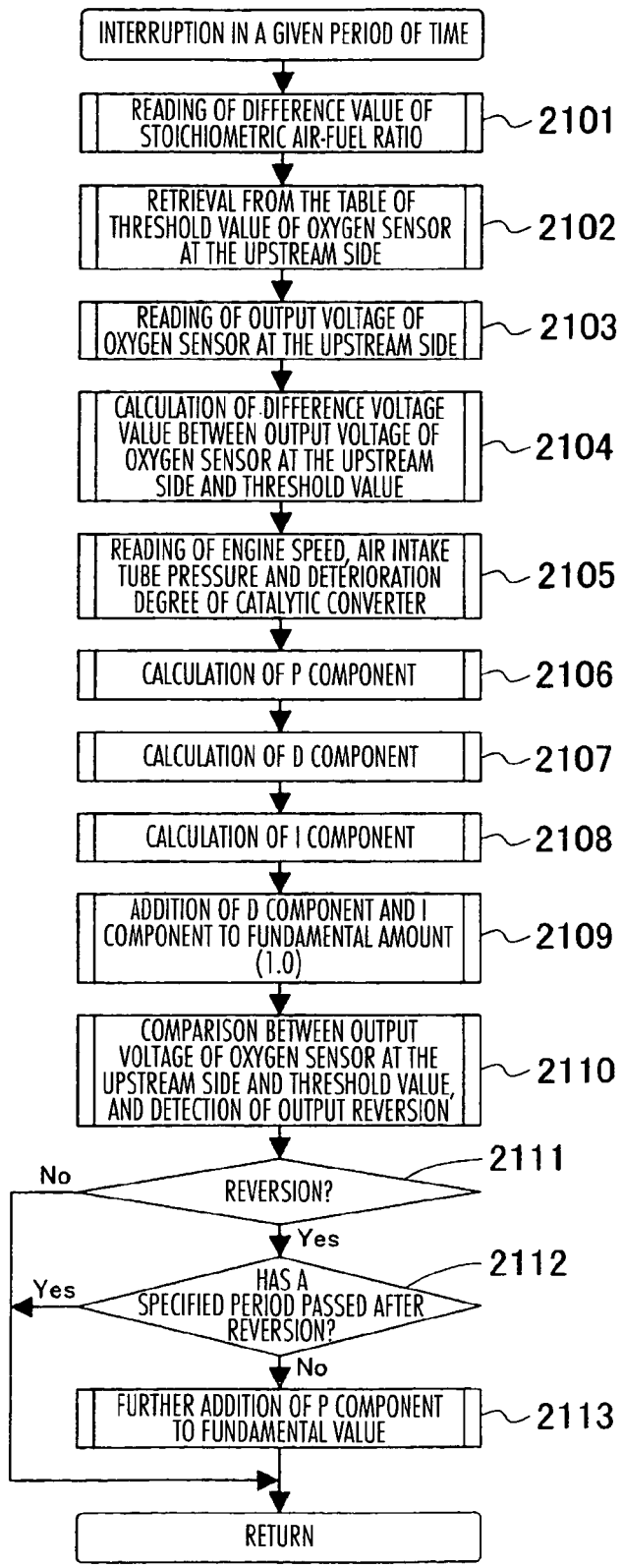
FIG. 22 is a flow chart showing processing flow of a feedback control unit of air-fuel ratio according to the present embodiment.

FIG. 22 shows processing flow of the air-fuel ratio feedback control unit 705 according to the embodiment shown in FIG. 8.

First of all, the above-described stoichiometric area difference value of air-fuel ratio of the catalytic converter is read (the step S2101), and the threshold voltage value of the oxygen sensor at the upstream side of the catalytic converter is retrieved from the table by the stoichiometric area difference value of air-fuel ratio of the catalytic converter (the step S2102).

Then, the output voltage of the oxygen sensor 213 at the upstream side of the catalytic converter is read (the step S2103), and difference value between the threshold value retrieved from the table, and the output voltage of the oxygen sensor read is calculated (the step S2104).

Then, engine speed, air intake tube pressure and deterioration degree of the catalytic converter are read (the step S2105), and a proportional component, a differential component and an integral component are calculated (the step S2106 to the step S2108).

Then, center value, 1.0, of feedback control coefficient of air-fuel ratio is added with the integral component and the differential component (the step S2109).

Then, whether it is within a specified time or not from the time the output of the oxygen sensor 213 at the upstream side the catalytic converter crossed the threshold value is judged (the step S2111, the step S2112), and when it is within the specified period, the above-described added value is further added with the proportional component to provide feedback control coefficient of air-fuel ratio (the step S2113).

Figure 23:
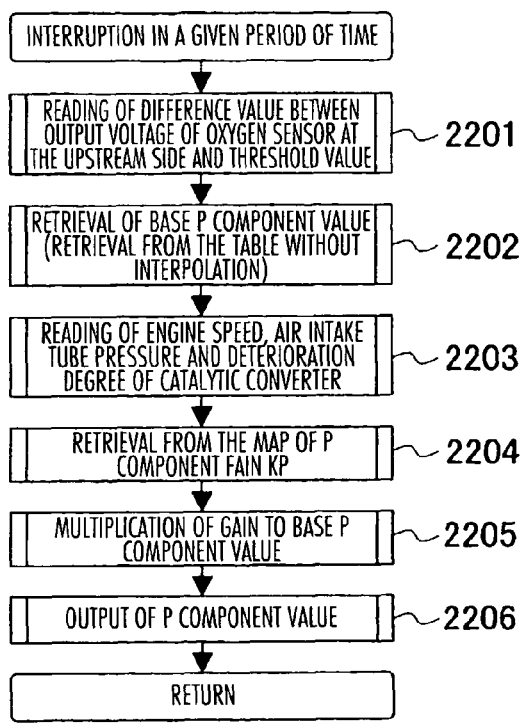
FIG. 23 is a flow chart showing processing flow of a proportional component calculation by a feedback control unit of air-fuel ratio according to the present embodiment.

FIG. 23 shows detailed processing flow of the proportional component calculation by the step S2106 (the proportional component calculation unit 803).

First of all, difference value between the output voltage of the oxygen sensor at the upstream side of the catalytic converter and the threshold value is read (the step S2201), and the base proportional component value is set from the difference value by retrieval from the table without interpolating (the step S2202).

Then, engine speed, air intake tube pressure and deterioration degree of the catalytic converter are read (the step S2203), and the map is selected according to deterioration degree of the catalytic converter read, and the proportional component gain KP is retrieved from the map based on engine speed and air intake tube pressure read (the step S2004). Next, the base proportional component value is multiplied by the gain KP retrieved from the map (the step S2205) to output as the proportional component (the step S2206).

Figure 24:
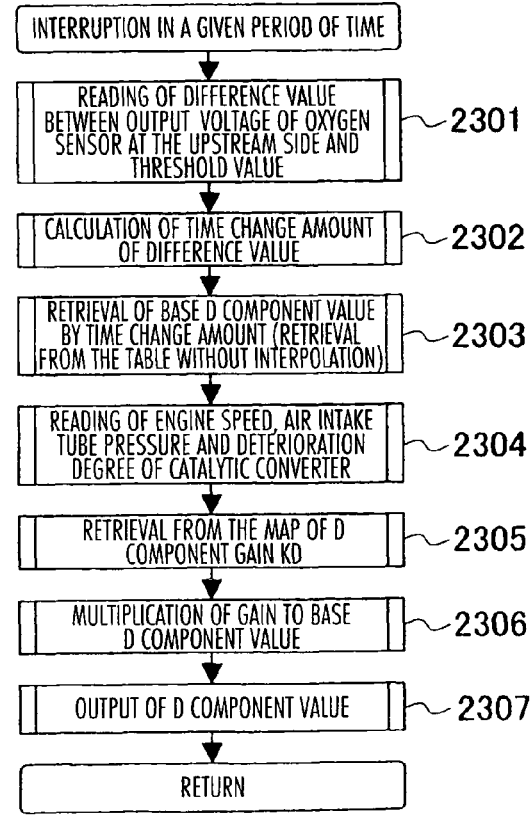
FIG. 24 is a flow chart showing processing flow of a differential component calculation by a feedback control unit of air-fuel ratio according to the present embodiment.

FIG. 24 shows detailed processing flow of the differential component calculation by the step S2107 (the differential component calculation unit 804).

First of all, difference value between the output voltage of the oxygen sensor 213 at the upstream side of the catalytic converter and the threshold value is read (the step S2301), and time change amount of the difference value is calculated (the step S2302).

Then, the base differential component value is set by retrieval from the map without interpolating, by the time change amount of the difference value (the step S2203).

Then, engine speed, air intake tube pressure and deterioration degree of the catalytic converter are read (the step S2304), and the map is selected according to deterioration degree of the catalytic converter read, and the differential component gain KD is retrieved from the map, based on engine speed and air intake tube pressure read (the step S2305). Next, the base differential component value is multiplied by the gain KD retrieved from the map (the step S2306) to output as the differential component value (the step S2307).

Figure 25:
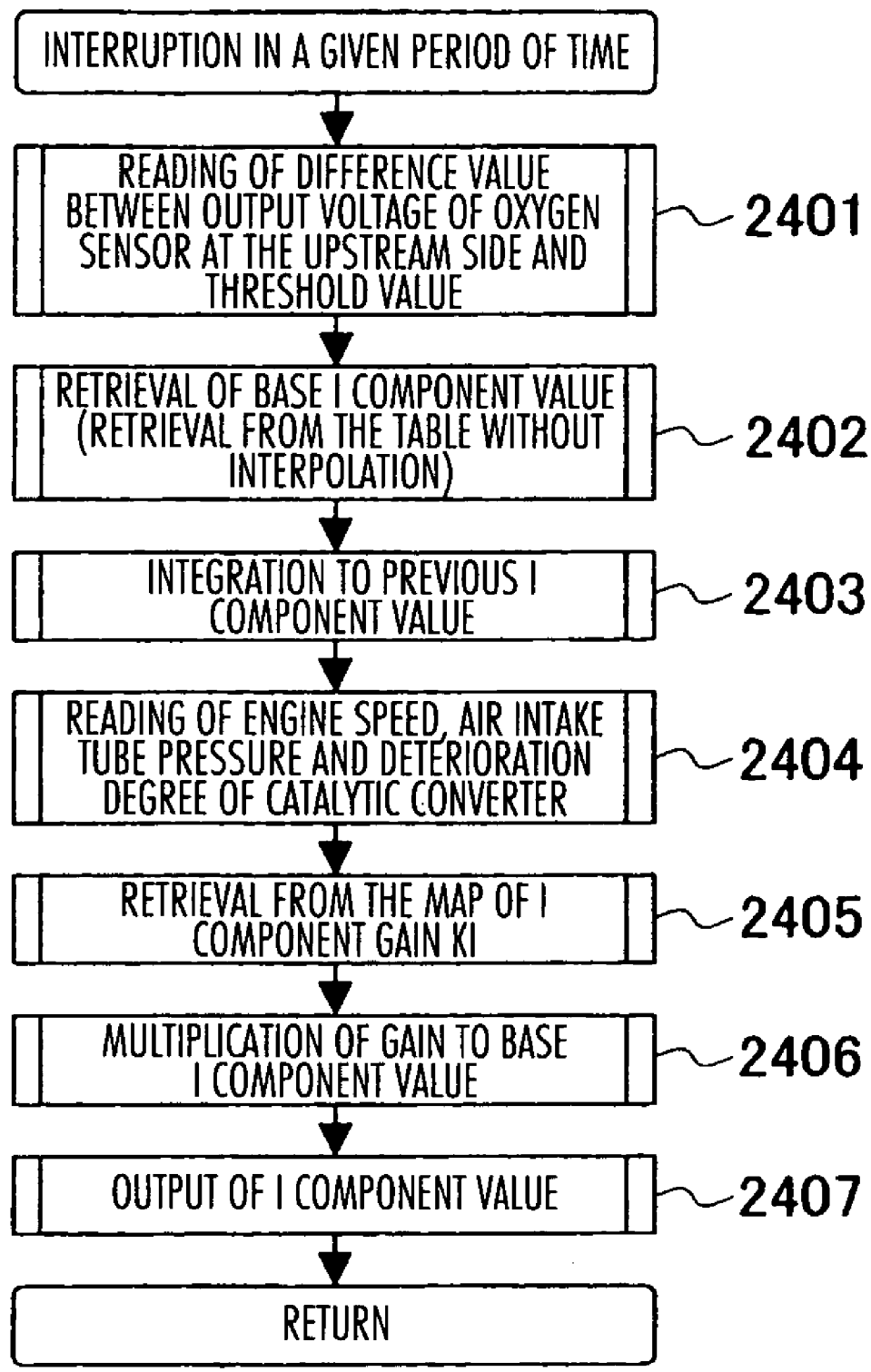
FIG. 25 is a flow chart showing processing flow of an integral component calculation by a feedback control unit of air-fuel ratio according to the present embodiment.

FIG. 25 shows detailed processing flow of the integral component calculation by the step S2108 (the integral component calculation unit 805).

First of all, difference value between the output voltage of the oxygen sensor 213 at the upstream side of the catalytic converter and the threshold value is read (the step S2401), and the base integral component value is set from the difference value by retrieval from the table without interpolating (the step S2402), and this value is integrated to the previous integral component value (the step S2403).

Then, engine speed, air intake tube pressure and deterioration degree of the catalytic converter are read (the step S2404), and the map is selected according to deterioration degree of the catalytic converter read, and the integral component gain KI is retrieved from the map based on engine speed and air intake tube pressure read (the step S2405). Next, the base integral component integrated value is multiplied by the integral component gain KI (the step S2406) to output as the integral component value (the step S2407).

Figure 26:
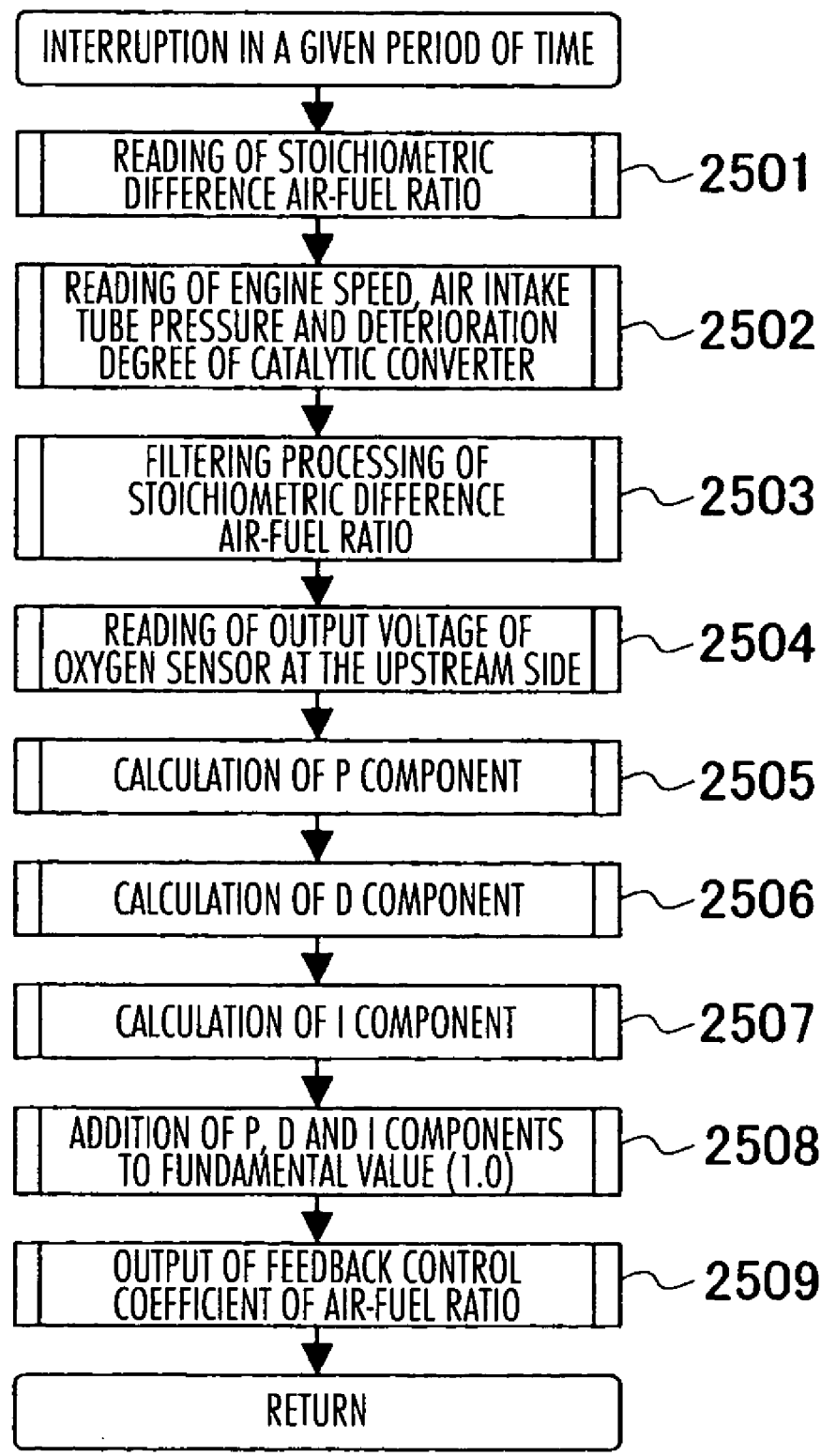
FIG. 26 is a flow chart showing processing flow of the feedback control unit of air-fuel ratio according to other embodiment.

FIG. 26 shows processing flow of the air-fuel ratio feedback control unit 705 according to the embodiment shown in FIG. 12.

First of all, the stoichiometric difference air-fuel ratio is read (the step S2501), then, engine speed, air intake tube pressure and deterioration degree of the catalytic converter are read (the step S2502). Next, the stoichiometric difference air-fuel ratio is subjected to filtering processing (the step S2503). Then, the output voltage of the oxygen sensor 213 at the upstream side of the catalytic converter is read (the step S2504).

Then, a proportional component, a differential component, and an integral component of air-fuel ratio feedback control are calculated (the step S2505 to the step S2507).

Then, center value, 1.0, of feedback control coefficient of air-fuel ratio is added with the calculated values of the proportional component, the differential component, and the integral component (the step S2508) to output these as feedback control coefficients of air-fuel ratio (the step S2509).

Figure 27:
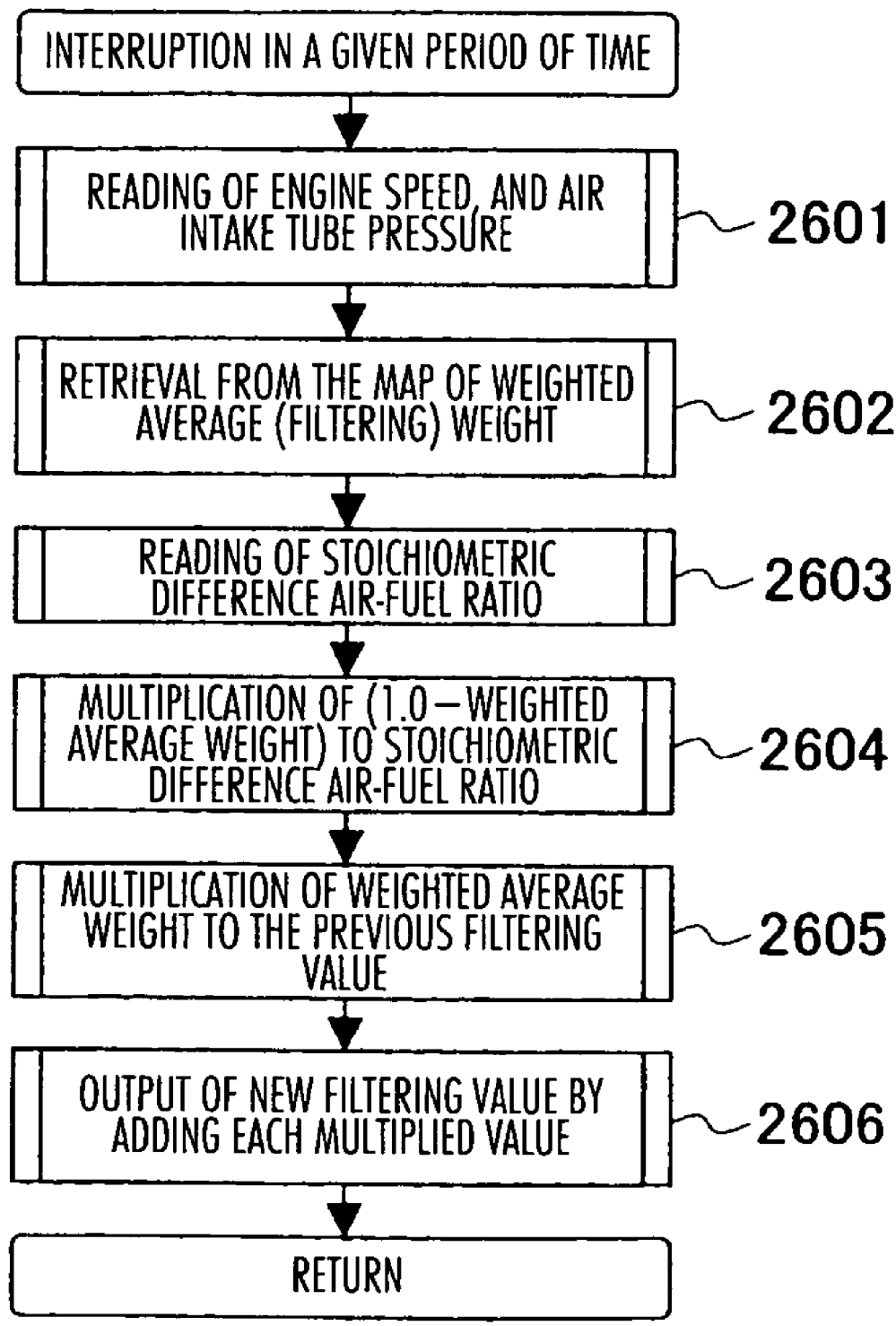
FIG. 27 is a flow chart showing a processing flow of filtering processing of the stoichiometric difference air-fuel ratio by an air-fuel ratio feedback control unit according to other embodiment.

FIG. 27 shows detailed filtering processing of the stoichiometeric difference air-fuel ratio by the step S2503 (the filtering processing unit 1201).

First of all, engine speed and air intake tube pressure are read (the step S2601), and then weighted average weight is retrieved from the map based on engine speed and air intake tube pressure read (the step S2602).

Then, the stoichiometeric difference air-fuel ratio is read (the step S2603), and the stoichiometeric difference air-fuel ratio read is multiplied by (1.0-weighted average weight) (the step S2604).

Then, the previous filtering value calculated in the present processing flow is multiplied by weighted average weight (the step S2605). Next, the above-described two multiplication results are added together to output as new filtering value (the step S2606).

Figure 28:
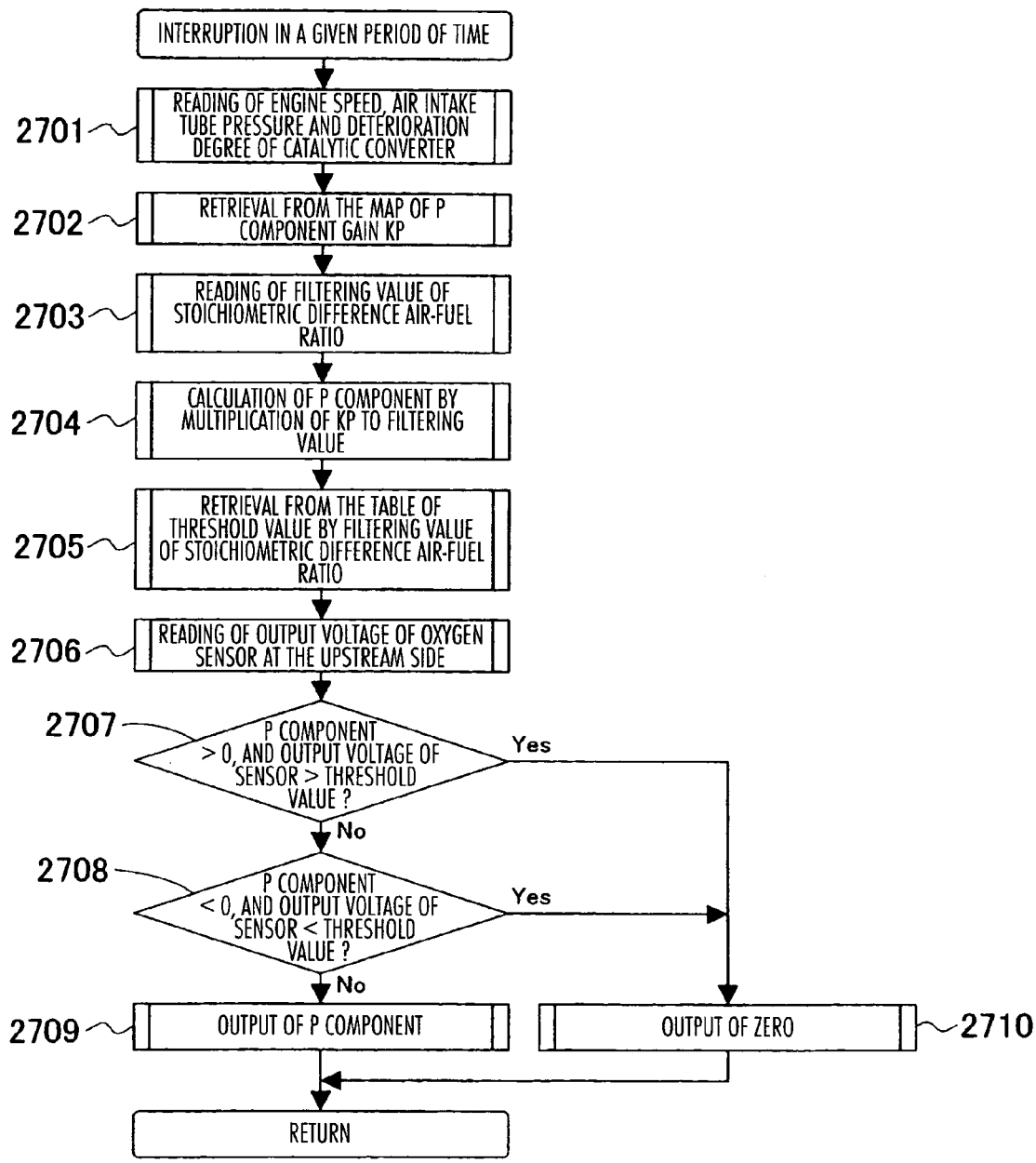
FIG. 28 is a flow chart showing processing flow of proportional component calculation by a feedback control unit of air-fuel ratio according to other embodiment.

FIG. 28 shows detailed processing flow of the proportional component calculation by the step S2505 (the proportional component calculation unit 1202).

First of all, engine speed, air intake tube pressure and deterioration degree of the catalytic converter are read (the step S2701), and then the map is selected according to deterioration degree of the catalytic converter read, and proportional component gain KP is retrieved from the map by engine speed and air intake tube pressure read (the step S2702).

Then, the above-described filtering value of the stoichiometeric difference air-fuel ratio is read (the step S2703), and the filtering value read is multiplied by the proportional component gain KP by retrieval from the map, to calculate the proportional component (the step S2704).

Then, the threshold output voltage value of the oxygen sensor 213 at the upstream side is retrieved from the table by the filtering value (the step S2705). Next, the output voltage of the oxygen sensor at the upstream side is read (the step S2706).

Then, judgment is made whether the calculated proportional component is larger than zero, and the output voltage read of the oxygen sensor at the upstream side is larger than the threshold value, or the calculated proportional component is smaller than zero, and the output voltage read of the oxygen sensor at the upstream side is smaller than the threshold value (the step S2707, the step S2708).

In the case when this judgment is not applied, calculated proportional component is output (the step S2709). On the other hand, in the case when the above-described judgment is applied, "zero" is output (the step S2710).

Figure 29:
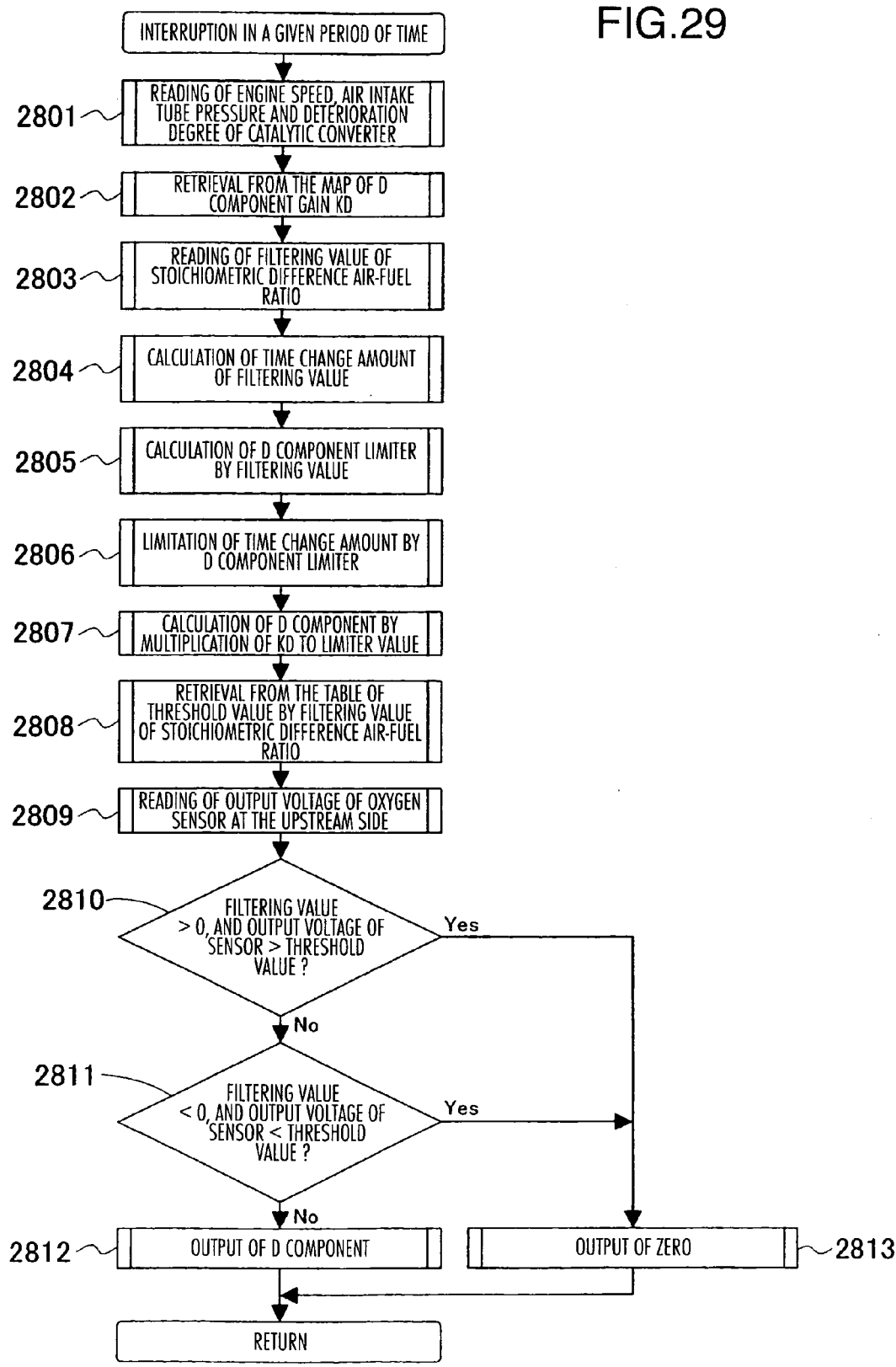
FIG. 29 is a flow chart showing processing flow of differential component calculation by a feedback control unit of air-fuel ratio according to other embodiment.

FIG. 29 shows detailed processing flow of the differential component calculation by the step S2506 (the differential component calculation unit 1203).

First of all, engine speed, air intake tube pressure and deterioration degree of the catalytic converter are read (the step S2801), and the map is selected according to deterioration degree of the catalytic converter read, and the differential component gain KD is retrieved from the map based on engine speed and air intake tube pressure read (the step S2802).

Then, filtering value of the above-described stoichiometeric difference air-fuel ratio is read (the step S2803), and time change amount of the filtering value read is calculated (the step S2304).

Then, differential component limiter value is determined from the filtering value read (the step S2805) and time change amount of the filtering value is limited by the limiter value (the step S2806).

Then, the time change amount of the filtering value after limiter processing is multiplied by the differential component gain KD to determine the differential component (the step S2807).

Then, threshold value of the output voltage of the oxygen sensor 213 at the upstream side of the catalytic converter is retrieved from the table, by the filtering value (the step S2808). Next, the output voltage of the oxygen sensor at the upstream side of the catalytic converter is read (the step S2809).

Then, judgment is made whether the filtering value is larger than zero, and the output voltage read of the oxygen sensor at the upstream side is larger than the threshold value, or the filtering value is smaller than zero, and voltage of the output voltage read of the oxygen sensor at the upstream side is smaller than the threshold value (the step S2810, the step S2811).

In the case when this judgment is not applied, calculated differential component is output (the step S2812). On the other hand, in the case when the above-described judgment is applied, "zero" is output (the step S2813).

Figure 30:
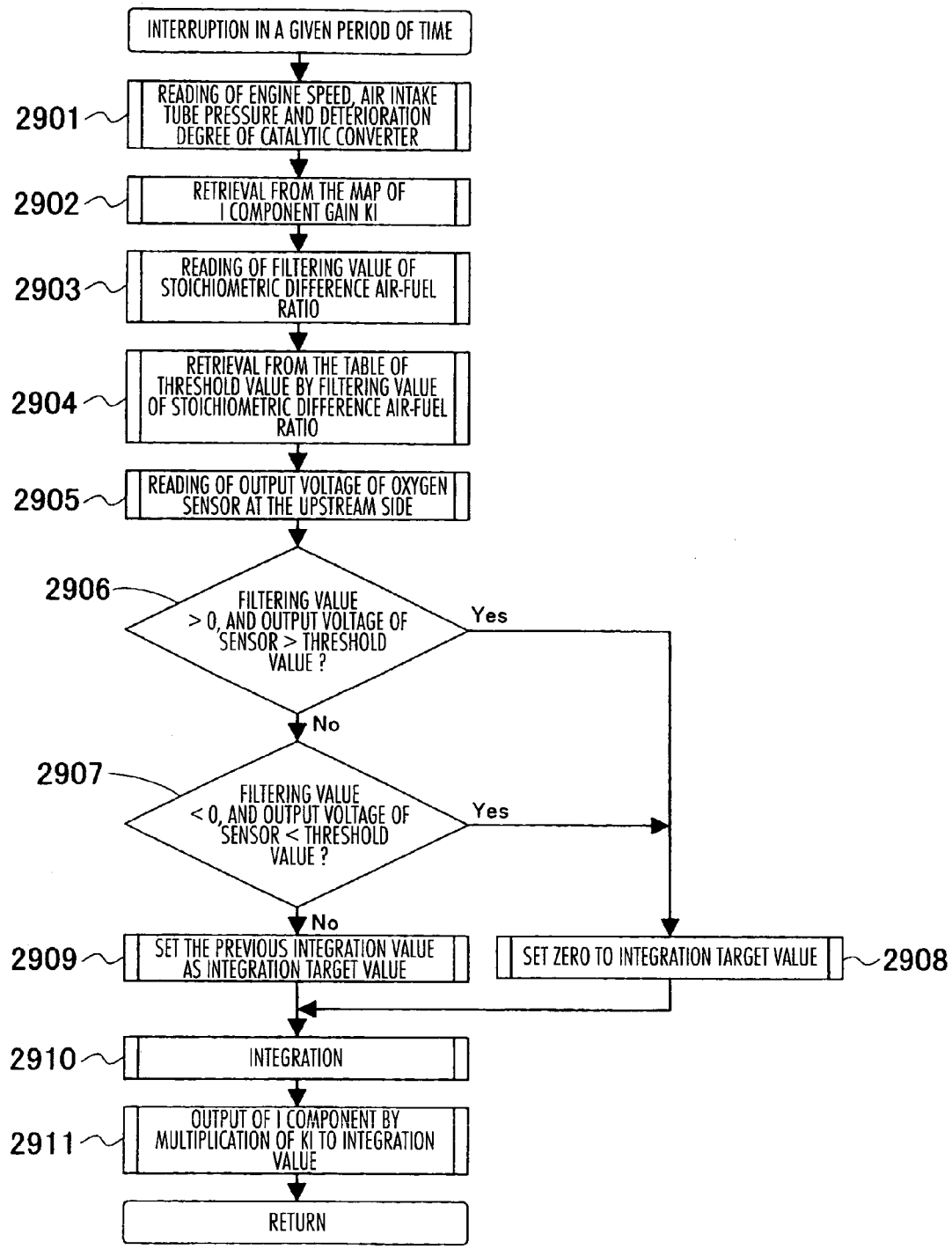
FIG. 30 is a flow chart showing processing flow of integral component calculation by a feedback control unit of air-fuel ratio according to other embodiment.

FIG. 30 shows detailed processing flow of the integral component calculation by the step S2507 (the integral component calculation unit 1204).

First of all, engine speed, air intake tube pressure and deterioration degree of the catalytic converter are read (the step S2901), and the map is selected corresponding to deterioration degree of the catalytic converter read, and the integral component gain KI is retrieved from the map, based on engine speed and air intake tube pressure read (the step S2902).

Then, filtering value of the above-described stoichiometeric difference air-fuel ratio is read (the step S2903), and threshold value of the output voltage of the oxygen sensor 213 at the upstream side is retrieved from the table, by the filtering value read (the step S2904). Next, the output voltage of the oxygen sensor at the upstream side is read (the step S2905).

Then, judgment is made whether the filtering value is larger than zero, and the output voltage read of the oxygen sensor at the upstream side is larger than the threshold value, or the filtering value is smaller than zero, and voltage of the output voltage read of the oxygen sensor at the upstream side is smaller than the threshold value (the step S2906, the step S2907).

In the case when this judgment is not applied, integration target value is set as the previous integration value (the step S2909). On the other hand, in the case when the judgment is applied, integration target value is set "zero" (the step S2908), namely the integration is stopped.

Then, the integration target value is multiplied by the filtering value (the step S2910) and this integration value is multiplied by integration element gain KI to output as the integration element (the step S2911).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An apparatus for controlling air-fuel ratio of an internal combustion engine being equipped with a catalytic converter having a three-way function; an oxygen sensor, which is installed at the upstream side of said catalytic converter in respect to exhaust gas flow direction, for generating a switching signal showing rich/lean relative to a certain air-fuel ratio; and an air-fuel ratio sensor, which is installed at the downstream side of said catalytic converter in respect to exhaust gas flow direction, for generating a linear output signal corresponding to the air-fuel ratio, at an exhaust gas passage, wherein said apparatus comprises:
   a deviation calculation means for calculating deviation between the air-fuel ratio measured by said air-fuel ratio sensor, and target air-fuel ratio; and
   a feedback control means of the air-fuel ratio for carrying out feedback control of the air-fuel ratio based on the deviation calculated by said deviation calculation means, and the output signal of said oxygen sensor, wherein
   said feedback control means of the air-fuel ratio includes
   a control variable calculation means for calculating a variable for feedback control of the air-fuel ratio by deviation calculated by said deviation calculation means;
   a comparison means for comparing whether the output voltage of said oxygen sensor is larger than a threshold value set responsive to deviation calculated by said deviation calculation means, or not; and
   a reflection judgment means for judging whether the control variable by said control variable calculation means should be reflected to feedback control of the air-fuel ratio or not, based on the comparison result of said comparison means and the control variable by said control variable calculation means.

2. The apparatus for controlling air-fuel ratio of an internal combustion engine according to claim 1 wherein
   said feedback control means of the air-fuel ratio carries out the feedback control of the air-fuel ratio responsive to difference value between the output signal of said oxygen sensor, and a threshold value set according to deviation calculated by said deviation calculation means.

3. The apparatus for controlling air-fuel ratio of an internal combustion engine according to claim 1, wherein
   said air-fuel ratio sensor is a linear air-fuel ratio sensor equipped with a heater, and drive of said heater is started after a specified period of time has passed after the start-up time of an internal combustion engine, and the output of said air-fuel ratio sensor is adopted after heater temperature has become not lower than a specified value.

4. The apparatus for controlling air-fuel ratio of an internal combustion engine according to claim 2, wherein
   said air-fuel ratio sensor is a linear air-fuel ratio sensor equipped with a heater, and drive of said heater is started after a specified period of time has passed after the start-up time of an internal combustion engine, and the output of said air-fuel ratio sensor is adopted after heater temperature has become not lower than a specified value.

5. The apparatus for controlling air-fuel ratio of an internal combustion engine according to claim 1, wherein
said air-fuel ratio sensor is a linear air-fuel ratio sensor equipped with a heater, and drive of said heater is started after a specified period of time has passed after the start-up time of an internal combustion engine, and the output of said air-fuel ratio sensor is adopted after heater temperature has become not lower than a specified value.

6. The apparatus for controlling air-fuel ratio of an internal combustion engine according to claim 1 wherein
said air-fuel ratio sensor is a linear air-fuel ratio sensor equipped with a heater, and drive of said heater is started after a specified period of time has passed from the time when the output of said oxygen sensor is judged to be adoptable, and the output of said air-fuel ratio sensor is adopted after heater temperature has become not lower than a specified value.

7. The apparatus for controlling air-fuel ratio of an internal combustion engine according to claim 2, wherein
said air-fuel ratio sensor is a linear air-fuel ratio sensor equipped with a heater, and drive of said heater is started after a specified period of time has passed from the time when the output of said oxygen sensor is judged to be adoptable, and the output of said air-fuel ratio sensor is adopted after heater temperature has become not lower than a specified value.

8. The apparatus for controlling air-fuel ratio of an internal combustion engine according to claim 1, wherein
said air-fuel ratio sensor is a linear air-fuel ratio sensor equipped with a heater, and drive of said heater is started after a specified period of time has passed from the time when the output of said oxygen sensor is judged to be adoptable, and the output of said air-fuel ratio sensor is adopted after heater temperature has become not lower than a specified value.

9. The apparatus for controlling air-fuel ratio of an internal combustion engine according to claim 1, further comprising a deterioration detection means of a catalytic converter for detecting deterioration degree of said catalytic converter, wherein a gain of feedback control of the air-fuel ratio is switched and set responsive to deterioration degree of said catalytic converter detected by said deterioration detection means of the catalytic converter.

10. The apparatus for controlling air-fuel ratio of an internal combustion engine according to claim 2, further comprising a deterioration detection means of a catalytic converter for detecting deterioration degree of said catalytic converter, wherein a gain of feedback control of the air-fuel ratio is switched and set responsive to deterioration degree of said catalytic converter detected by said deterioration detection means of the catalytic converter.

11. The apparatus for controlling air-fuel ratio of an internal combustion engine according to claim 1, further comprising a deterioration detection means of a catalytic converter for detecting deterioration degree of said catalytic converter, wherein a gain of feedback control of the air-fuel ratio is switched and set responsive to deterioration degree of said catalytic converter detected by said deterioration detection means of the catalytic converter.

12. A method for controlling air-fuel ratio of an internal combustion engine equipped with at the exhaust gas passage: a three-way catalytic converter; an oxygen sensor, which is installed at the upstream side of said catalytic converter in respect to exhaust gas flow direction, for generating a switching signal showing rich/lean relative to a certain air-fuel ratio; and an air-fuel ratio sensor, which is installed at the downstream side of said catalytic converter in respect to exhaust gas flow direction, for generating a linear output signal corresponding to the air-fuel ratio, said method comprising the steps of:
calculating deviation between the air-fuel ratio measured by said air-fuel ratio sensor, and target air-fuel ratio; and
carrying out feedback control of the air-fuel ratio, based on said deviation and the output signal of said oxygen sensor, which includes
calculating a variable for feedback control of the air-fuel ratio by deviation calculated by said deviation calculation means;
comparing whether the output voltage of said oxygen sensor is larger than a threshold value set responsive to deviation calculated by said deviation calculation means, or not; and
reflection judging whether the control variable by said control variable calculation means should be reflected to feedback control of the air-fuel ratio or not, based on the comparison result of said comparison means and the control variable by said control variable calculation means.

* * * * *